US011767082B2

(12) United States Patent
Hamed

(10) Patent No.: US 11,767,082 B2
(45) Date of Patent: Sep. 26, 2023

(54) AUTOMATIC BICYCLE SHIFTER AND LEARN USER INTERFACE

(71) Applicant: Hazem Nihad Hamed, Huntington Beach, CA (US)

(72) Inventor: Hazem Nihad Hamed, Huntington Beach, CA (US)

(*) Notice: Subject to any disclaimer, the term of this patent is extended or adjusted under 35 U.S.C. 154(b) by 135 days.

(21) Appl. No.: 17/367,611

(22) Filed: Jul. 5, 2021

(65) Prior Publication Data

US 2023/0014867 A1 Jan. 19, 2023

(51) Int. Cl.
| | |
|---|---|
| *B62J 45/20* | (2020.01) |
| *B62J 50/22* | (2020.01) |
| *B62M 25/08* | (2006.01) |
| *G05B 13/02* | (2006.01) |
| *B62J 45/411* | (2020.01) |
| *B62J 45/414* | (2020.01) |
| *B62J 45/412* | (2020.01) |

(52) U.S. Cl.
CPC ............ *B62M 25/08* (2013.01); *B62J 45/20* (2020.02); *B62J 45/411* (2020.02); *B62J 45/412* (2020.02); *B62J 45/414* (2020.02); *B62J 50/22* (2020.02); *G05B 13/0265* (2013.01)

(58) Field of Classification Search
CPC ..... G05B 13/0265; B62J 50/22; B62J 45/414; B62J 45/412; B62J 45/411; B62J 45/20; B62M 25/08
See application file for complete search history.

(56) References Cited

U.S. PATENT DOCUMENTS

| | | | | |
|---|---|---|---|---|
| 9,234,580 | B1* | 1/2016 | Usui | B62M 25/08 |
| 9,284,018 | B2* | 3/2016 | Tauchi | B62M 25/08 |
| 9,975,603 | B2* | 5/2018 | Bortolozzo | B62J 45/416 |
| 10,167,056 | B2* | 1/2019 | Hashimoto | B62M 9/123 |
| 11,077,908 | B1* | 8/2021 | Hamed | H04W 4/80 |
| 11,345,441 | B2* | 5/2022 | Hamed | B62M 25/08 |
| 2017/0361891 | A1* | 12/2017 | Crowell | B62J 45/40 |
| 2019/0249769 | A1* | 8/2019 | Hamed | F16H 63/42 |
| 2019/0263474 | A1* | 8/2019 | Hamed | B62M 9/1342 |

FOREIGN PATENT DOCUMENTS

WO WO-2005054872 A2 * 6/2005 ............. B62J 11/00

* cited by examiner

*Primary Examiner* — Tisha D Lewis

(57) ABSTRACT

An automatic bicycle shifter making use of a global positioning system (GPS) altimeter for sensing road inclination, an accelerometer for sensing bicycle acceleration and a hot wire anemometer for sensing wind load, and through application of classical law of conservation of energy attenuates or appreciate automatic shifting speeds in real time to maintain a rider standard shifting torque. Automatic bicycle shifter is additionally provided with capability to sense, record, and interpret rider automatic shift override commands and further adjust automatic shift criteria to rider preference.

7 Claims, 22 Drawing Sheets

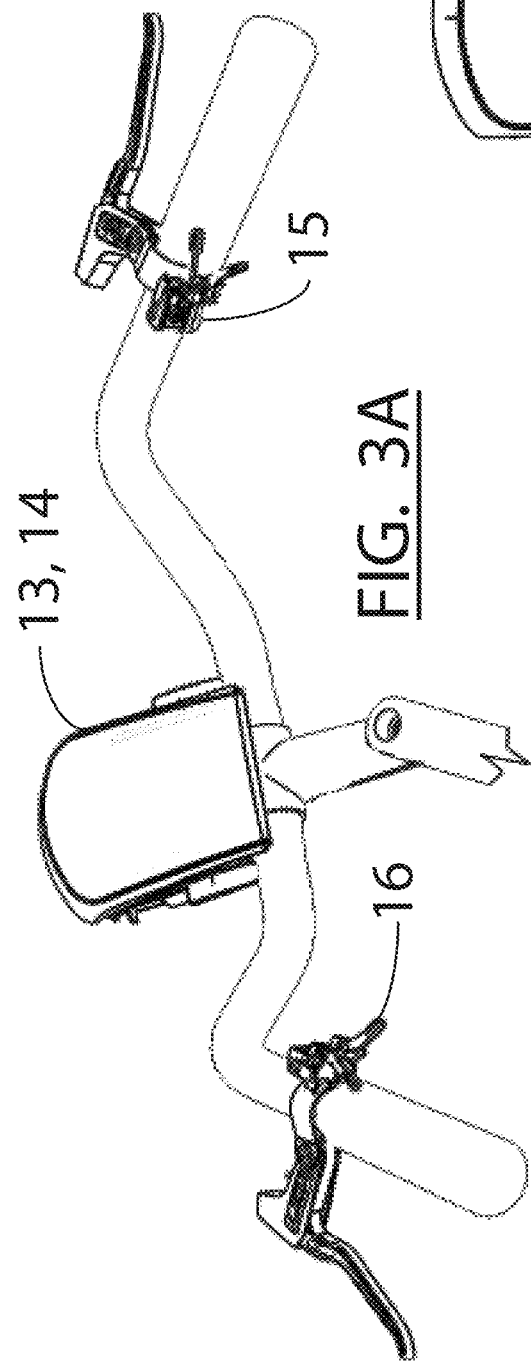
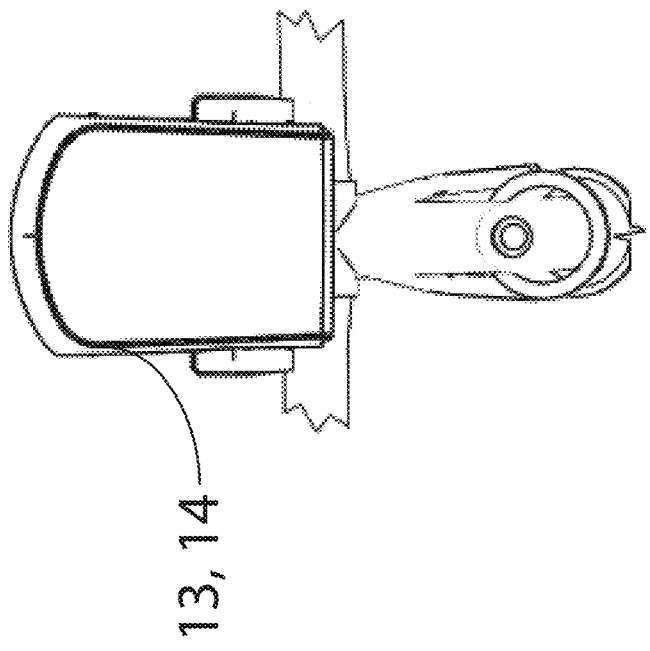
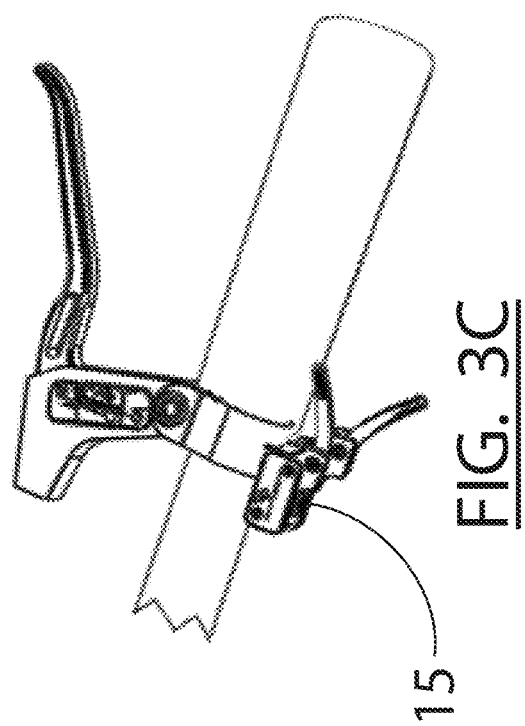
FIG. 3A
FIG. 3B
FIG. 3C

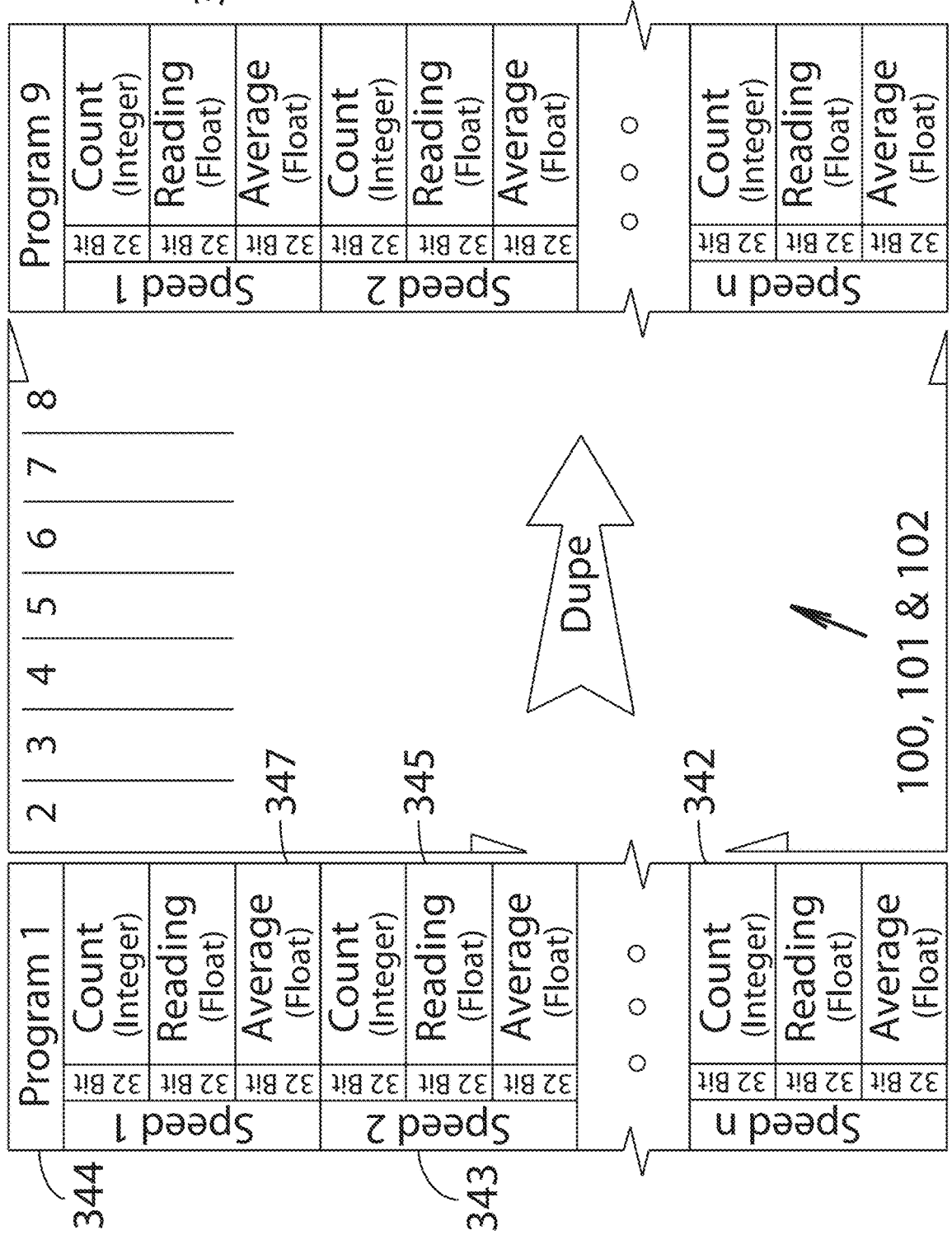
FIG. 21 Auto Learn Mode Weighted Speed Average Calculation

AUTOMATIC BICYCLE SHIFTER AND LEARN USER INTERFACE

CROSS-REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

The disclosed invention relates to the cycling transportation and sporting industry, specifically to modern bicycle designs typically making use of a gearing or sprockets based powertrain configurations permitting the rider to achieve an optimal drivetrain ratio thereby facilitating a comfortable pedaling rates and efforts thereof depending on rider preference for road speed, rider conditioning, road inclination, acceleration, wind load and other circumstantial conditions.

BACKGROUND OF THE INVENTION

Bicycles have existed for many years serving throughout as transportation and sporting means. Over the great time span since their inception, the technology has evolved with numerous designs and advancements predominantly geared toward addressing rider comfort. With the initial designs from many years ago comprising a single speed power transmission mechanism often requiring the rider to either exert undue effort on the pedals or has to alternate the pedals at an uncomfortably high rate to achieve desired riding speed, a need was recognized for multiple powertrain ratios to facilitate acceptable pedaling rates and efforts. A de-facto four bar linkage shifting mechanism subsequently emerged comprising additional power transmission sprockets of various number of teeth added in the axial directions of the pedals mechanism as well as power transmission rear wheel along with an integral chain tensioning apparatus and a set of rider lever based sheathed cable actuation mechanisms permitting selection of desired combinations of front and rear drive sprockets to suit road condition, rider biometrics and preference. Advancements in the actuation mechanism included indexing capability of the operator lever assembly so that the actuation of the sprocket alternation mechanism takes place in an indexing fashion consistently properly aligning the chain with desired sprocket thereof rather than one continuous motion requiring the rider to guess the proper chain position often leading to positioning errors. With the fundamental disadvantage of the de-facto derailleur design inability to shift during stoppage, a variety of designs replacing the derailleur assembly with gearing based power transmissions, some integrated internally into the bicycle rear hub and others incorporated at or near the bicycle pedaling assembly, consequently evolved thereby providing the rider with the same power transmission shifting capability through the same sheathed cable shifting apparatuses in a more self-contained and sealed package which the rider could shift at will without the otherwise necessary bicycle pedaling motion.

Other but less successful attempts in the evolution of the conventional bicycle design was the technology to automate the power transmission shift operation thereby relieving the rider of the constant manual shifting task. Numerous attempts have been made over many years to provide a robust yet commercially successful product. Some were attempts sacrificing robust componentry for cost, tight packaging and commerciality, while others were based on complex mathematical or fixed criteria based on "one for all" approaches. All ultimately achieving varying levels of success but uniformly falling short of meeting widespread commercial acceptance. On the fundamental level, most of these offerings had in common the failure to recognize that acceptance of these various designs ultimately boiled down to adaptability by a user population widespread in biometrics, endurance, strength and other personal attributes.

The inventor hereby discloses an electrically powered shifting apparatus for automatic control of the powertrain ratio of the bicycle in order to relieve the rider of manual shifting tasks through servo motor based shifter actuation, a robust microprocessor based logic control system making use of various speed, controls, a hot wire anemometer for measuring wind speed, an accelerometer for measuring acceleration, and a Global Positioning System (GPS) with location altitude output capability, all seamlessly integrated around an advanced user interface with capability to learn and store shifting behavior of the rider which, through either a predefined or a continually available learning period for the microprocessor based control system, serves to dispatch learned behavior thereof upon demand, thereby placing the bicycle powertrain in an optimal shift position on a consistent basis in order to facilitate acceptable pedaling rates and suitable efforts, all based on exacting criteria for rider biometrics, capability and needs.

Disclosure further outlines a novel approach for road inclination, frontal wind speed and bicycle acceleration compensation rooted in recording of nominal torques, accelerations and efforts governing the rider shifting behavior preferably under standard level road surface, low wind and normal acceleration but also possible under any inclination, acceleration and wind speed conditions and through application of on classical mechanics law of conservation of energy, seek to attenuate or appreciate the shifting speed in order to maintain an equivalent effort during shifting under varying road inclinations, wind loads and accelerations, and further refine the computed shifting criteria through additionally recording actual rider shifting behavior under these circumstances and adjust the computed shifting criteria to suit. Rider is additionally offered means to control the amount of compensation applied by the shifting algorithm through a simple level bar on the user interface.

DISCUSSION OF PRIOR ART

The following is a brief summary of prior art deemed pertinent to the automatic bicycle shifter user and learn user interface of the present invention.

U.S. Pat. No. 10,640,171 B2 proposes a design for alleviating the bicycle rider from the demanding task of continually seeking an acceptable shift setting. Although proposed design presents an effective solution highly adaptable by the rider to this challenging problem, it falls short of outlining capability to learn the shifting pattern of the rider and fine tune and continually improve the automatic shifting presets for the rider.

U.S. Pat. No. 10,167,056 B2 discloses a bicycle transmission control apparatus making use of various sensors and using a complex algorithm for automatically shifting a bicycle drive train. Notwithstanding the endeavor in the art, this approach does not take into account the rider metrics or conditioning and is therefore likely to fall short of achieving the intended objective.

U.S. Pat. No. 9,975,603 B2 discloses a bicycle transmission control apparatus making use of various sensors including a rider heart rate monitor and using a complex algorithm for automatically shifting a bicycle drive train. Notwithstanding the endeavor in the art, although this approach does partially take into account the rider conditioning it falls short of other important physical limitations like gender, strength and weight.

U.S. Pat. No. 9,284,018 B2 discloses another bicycle transmission control apparatus geared toward application of an inclination sensor and uses a simplified algorithm for automatically shifting a bicycle drive train. Notwithstanding the endeavor in the art, this approach does not take into account a multitude of parameters that impact viability of automatic shifting and therefore sure to fall short of intended objective.

U.S. Pat. No. 9,234,580 discloses a control device for a bicycle automatic transmission comprising an entailed computation algorithm based traveling resistance computed with readings of torque measurements, cadence or pedaling rate, bicycle speed and mass of bicycle and rider. As this approach is fundamentally based on assuming that two riders with the same weight but with significantly different muscles to fat ratios have synonymous abilities, the end result that this approach is likely to yield seems to be less than optimal. This disclosure, additionally falls short of providing a bicycle shifting criteria highly adaptable by the rider devoid of any complex mathematical calculations destined to fall short of providing riders an adequate result.

BRIEF SUMMARY OF THE INVENTION

Applicant discloses means for achieving the highly desirable option of relieving the bicycle rider of the drivetrain shifting tasks through equipping the bicycle shifter mechanism with a servo power actuation device governed by a microprocessor based electronic control system comprising a bicycle speed, acceleration, wind load, and a road location inclination sensor to proactively manage in real time powertrain shifting criteria based on operator shifting behavior through a predefined learning period or optionally, in a continually improving manner resulting in an optimal and automatically selected drive operation ratio in order to facilitate acceptable pedaling rates and efforts to suit rider preference.

The preferred embodiment of the automatic bicycle shifter and learn user interface of the present invention, slaved thereof to an electric servo motor actuated shifting mechanism controlled by a comprehensive microprocessor-based controls system additionally making use of a bicycle speed sensor, a forward motion accelerometer, a wind speed hot wire anemometer, a Global Positioning System (GPS) device with altitude feedback capability and a motor power amplifier, and presented to the rider on a touchscreen display permitting the rider to teach the control system his or her shifting behavior through operation of the bicycle in a mode where the rider manually operates the shifting controls over a predefined period of time, or optionally placing the user interface a continually updating mode, serves to precisely fine tune shifting presets of the bicycle powertrain to rider preference, thereby proactively predicting and automatically conducting the desired bicycle shift actions on the riders behalf.

With the proposed bicycle controls philosophy being directly applicable to geared powertrain bicycles, inventor extends the controls definition of the proposed automatic bicycle shifter user interface of the present invention to suit operation of derailleur based bicycles by additionally redefining the rider controls to teach the bicycle electronic control system a set of predefined shift combinations of the front and rear derailleurs thereby reducing the shift operation to a single controls action governing both derailleurs thereof and permitting the proposed learn user interface to learn rider shifting behavior over a prespecified period of time or optionally on a constantly updating basis in order to proactively manage the bicycle shift combinations for the rider automatically on a consistent basis, and thereby providing the same functionality proposed for geared powertrain bicycles.

As rider comfort is a continually moving target based on the rider condition often governed by traveled distance, conditioning, road and weather conditions, the automatic bicycle shifter and learn user interface of the present invention is grants the rider the ability to define a number of shifting programs each geared toward a certain riding function such as racing, traveling, cruising or riding with a group. Means to continually adjust the bicycle shifting criteria with ease is additionally offered through slide touch controls realizing ability to proportionately adjust shifting speeds up or down.

With one of the most challenging aspects of automatic control of the bicycle being the ability to sense and govern shifting action under varying road inclination, acceleration and wind load conditions, inventor proposes a novel approach rooted in mathematical computation of the climbing effort component of the classical mechanics law of conservation of energy for the effort being applied by the rider. Control logic thereof based on overall riding mass and profile combined with explicit shifting data points the rider enters when he or she actuates the shifter in a "Learn Mode" during varying condition thereof interpolated and extrapolated, are used as basis to pre-emptively control the shifting speed combinations to account for road inclination, acceleration and varying wind load conditions.

Additionally, applicant discloses the novel approach of inclination compensation based on data received from a Global Positioning System (GPS) through "look ahead" of a number of altitude data points based on rider speed used as a basis for application proper amount of road inclination compensation to the shifting apparatus. It is additionally incumbent that road inclination compensation be explicitly invoked by the rider through a simple manual on/off button permitting the rider to explicitly enable or disable road inclination compensation.

BRIEF DESCRIPTION OF THE DRAWINGS

FIG. 3A is a view of the operator panel, switches and control system of the preferred embodiment of the automatic bicycle shifter and learn user interface of the present invention.

FIG. 3B is a closeup view of the operator panel and control system of the preferred embodiment of the automatic bicycle shifter and learn user interface of the present invention.

FIG. 3C is a closeup view of the right handlebar side located manual override switches of the preferred embodiment of the automatic bicycle shifter and learn user interface of the present invention.

FIG. 21 is a view of the controller memory layout and "weighed average" auto learn shift speed computation method of the preferred and alternate embodiments of the automatic bicycle shifter and learn user interface of the present invention.

DETAILED DESCRIPTION OF THE INVENTION

Figure 1:
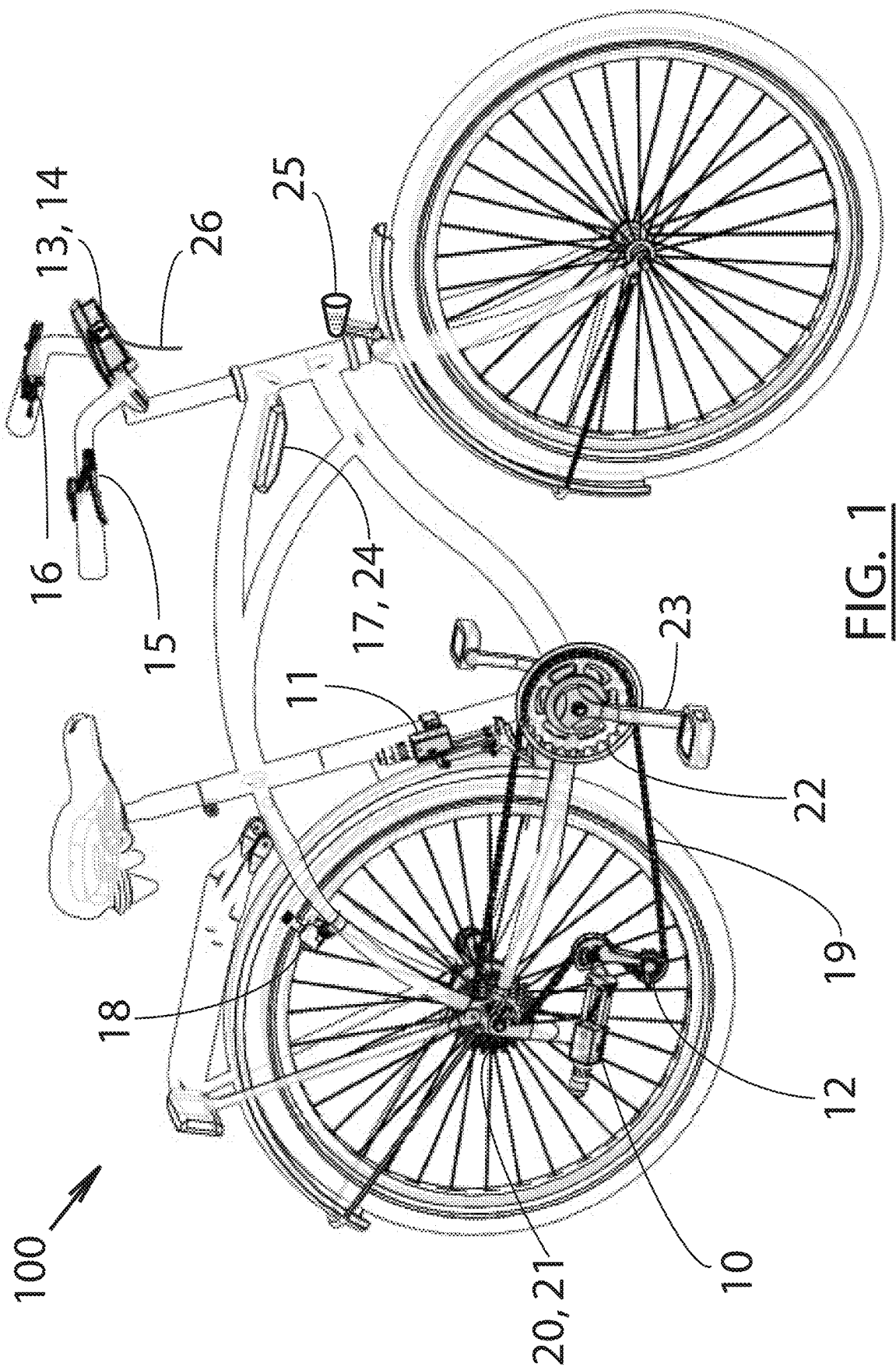
FIG. 1 is a perspective overall view of the systems and components comprising the preferred embodiment of the automatic bicycle shifter and learn user interface of the present invention.
Figure 2:
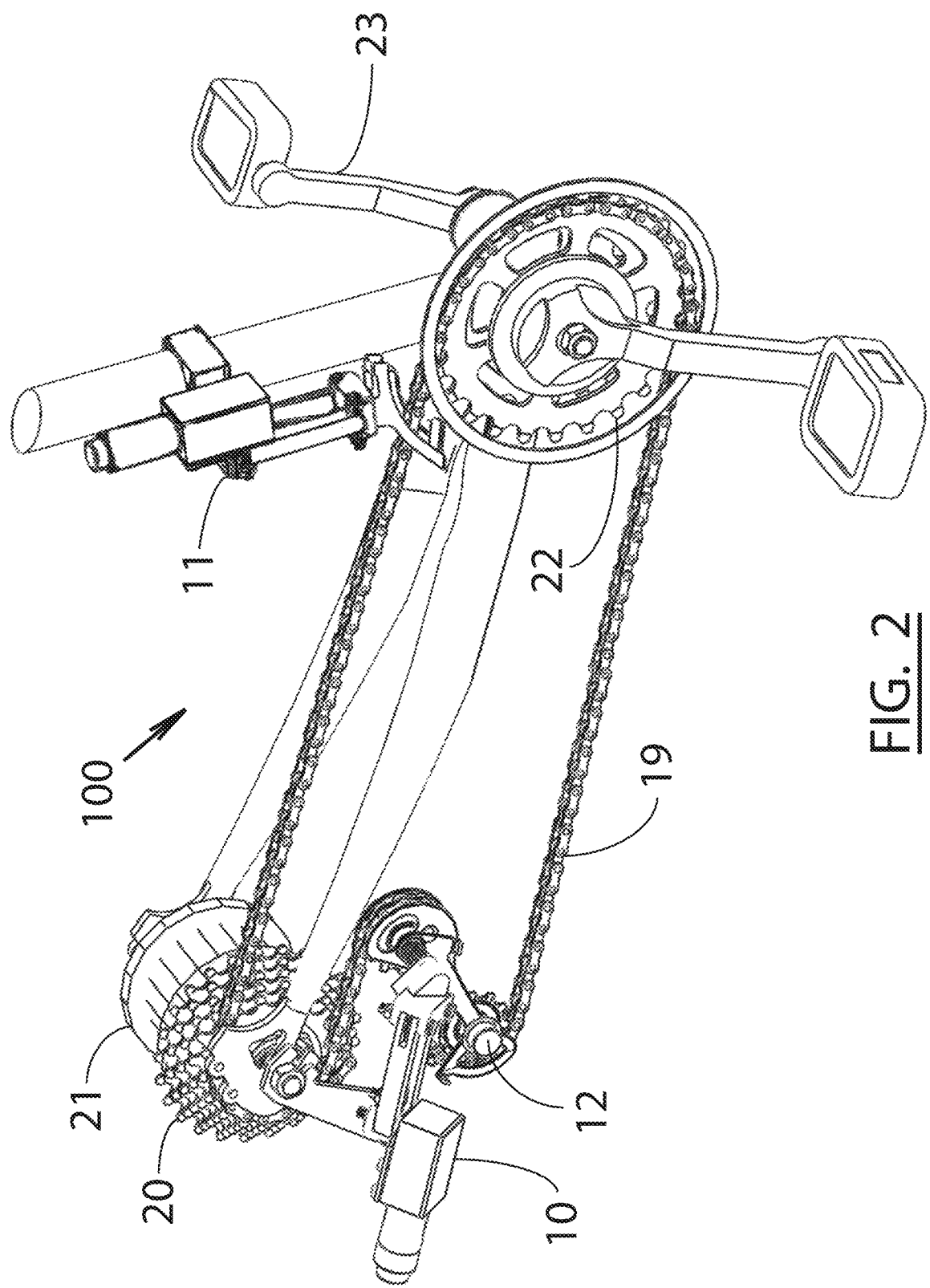
FIG. 2 is a perspective view of the power transmission apparatus of the preferred embodiment of the automatic bicycle shifter and learn user interface of the present invention.
Figure 4:
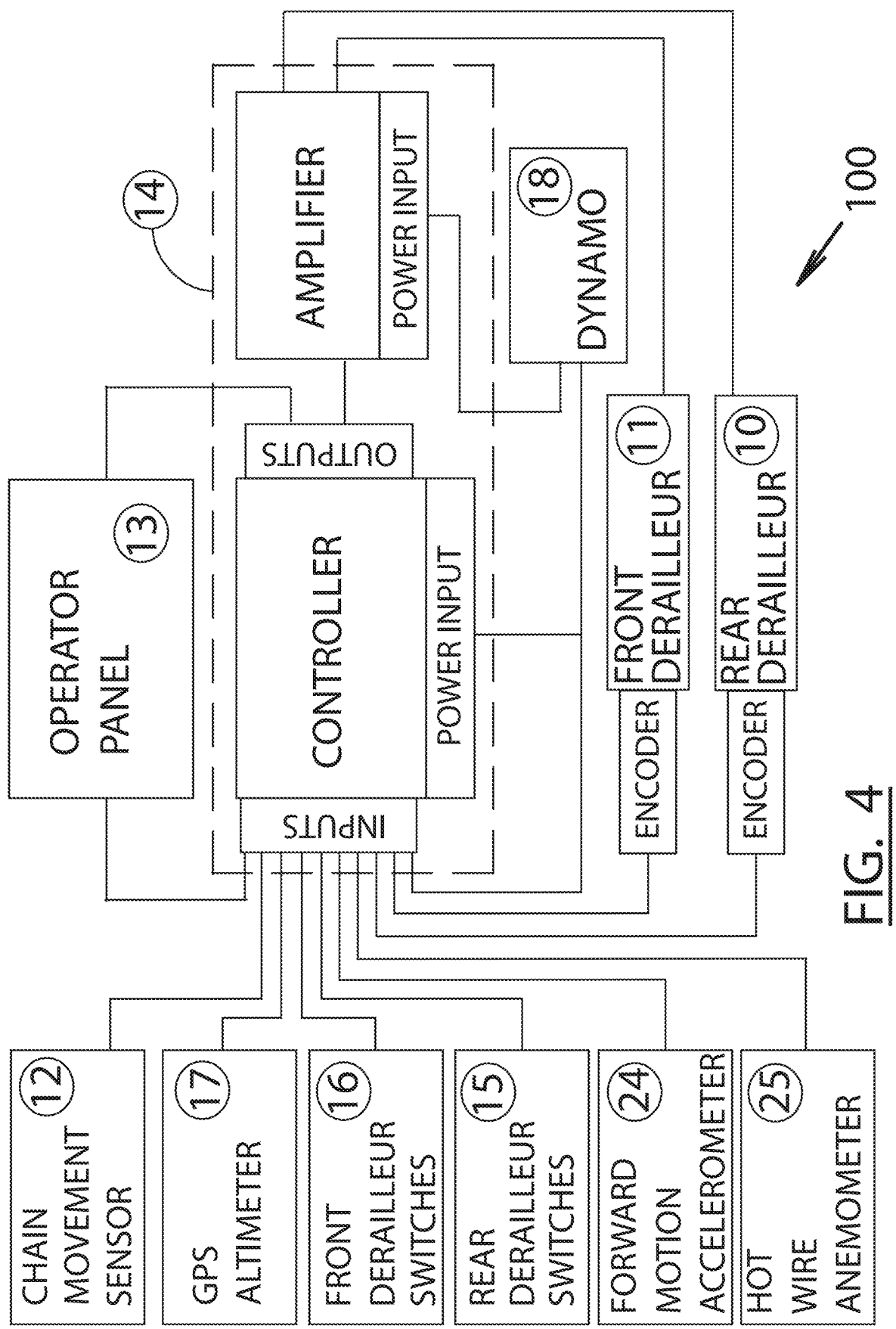
FIG. 4 is a block diagram of the control system and components of the preferred embodiment of the automatic bicycle shifter and learn user interface of the present invention.

Preferred Embodiment Construction—FIGS. 1-4.

With reference to FIGS. 1-4, the preferred embodiment 100 of the automatic bicycle shifter and learn user interface of the present invention comprises rear derailleur assembly 10 serving to alternate chain 19 between sprockets 20 of rear drive hub assembly 21, front derailleur assembly 11 serving to alternate chain 19 between front sprockets assembly 22 of front pedals assembly 23, chain movement sensor 12 providing the "must" present chain movement signal for any actuation of the front or rear derailleur assemblies 10 and 11 respectively, operator panel 13, control system 14, rear derailleur manual shifting switches 15, front derailleur manual shifting switches 16, GPS Altimeter 17 and dynamo 18 serving as expended power replenishment means as well as bicycle speed sensing means, forward motion Accelerometer 24 serving to provide acceleration data to control system 14, and hot wire Anemometer 25 serving to provide wind speed data thereof. Partially shown wiring harness 26 serves to interconnect control system 14 to operator panel 13, manual switches 15 and 16, GPS Altimeter 17, front derailleur 11, dynamo 18, rear derailleur 10, chain movement sensor 12, forward motion Accelerometer 24, and hot wire Anemometer 25.

Applicant stresses that although forward motion Accelerometer 24 is being referred to as a hardware component undoubtedly comprising a best implementation thereof, a software solution based on differentiation of signal of dynamo 18 bicycle sensing means is also plausible and would thereby serve the same purpose. Therefore, the term "Accelerometer" 24 is being loosely used throughout this disclosure being either a hardware device producing a signal in known relationship to the change in speed of the bicycle or a software implementation of differentiation of the speed sensing means of the bicycle.

Applicant additionally stresses that although hot wire Anemometer 25 offers the best solution for a wind load measurements, other less costly devices based on a mechanical propeller means are available and could thereby serve the same purpose. Therefore, the term "hot wire Anemometer" 25 is also being loosely used throughout this disclosure with the term referring to an actual "how wire Anemometer" or a "wind speed sensing means".

Figure 5:
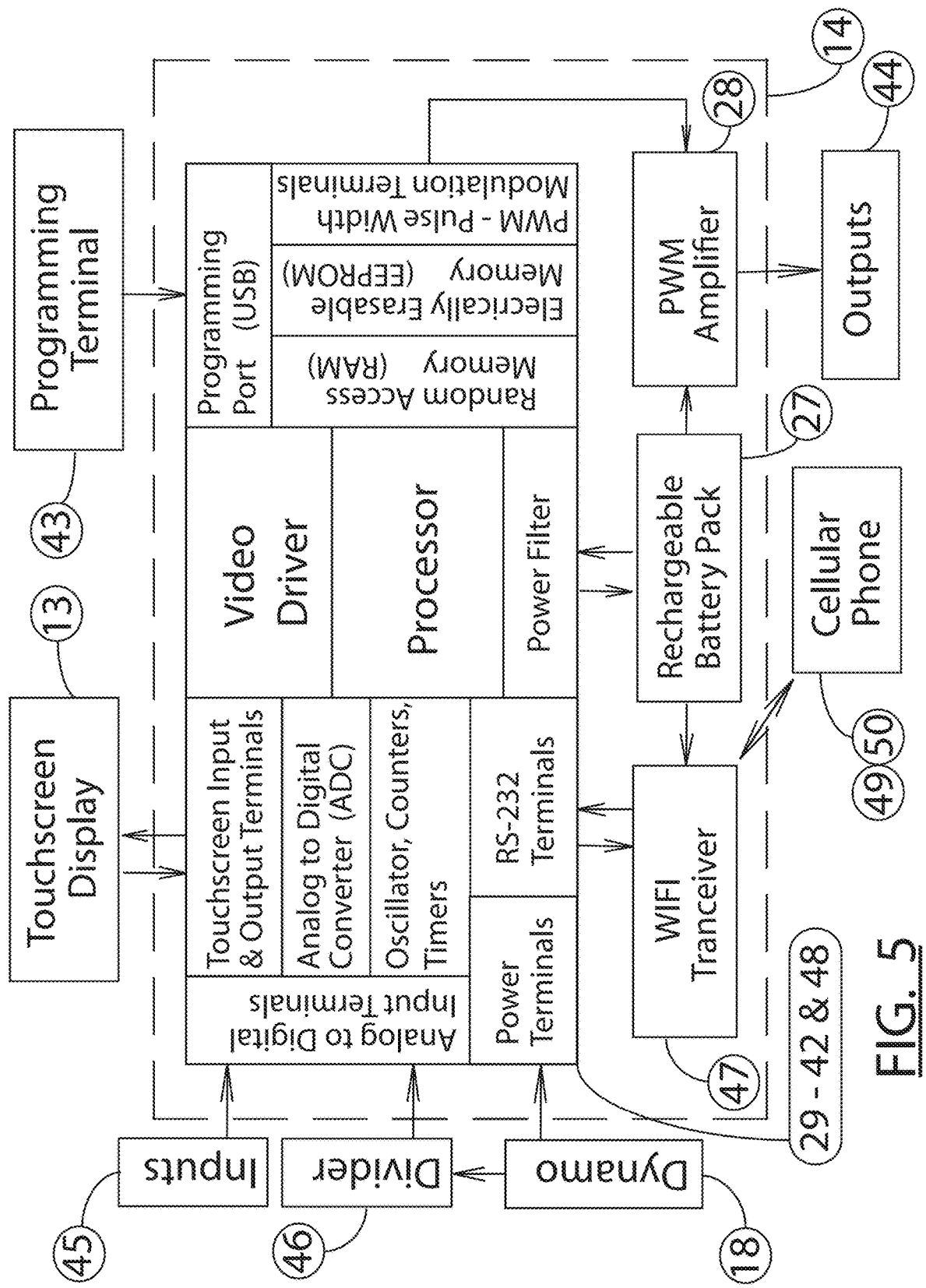
FIG. 5 is a block diagram of the controller of the preferred embodiment of the automatic bicycle shifter and learn user interface of the present invention.
Figure 6:
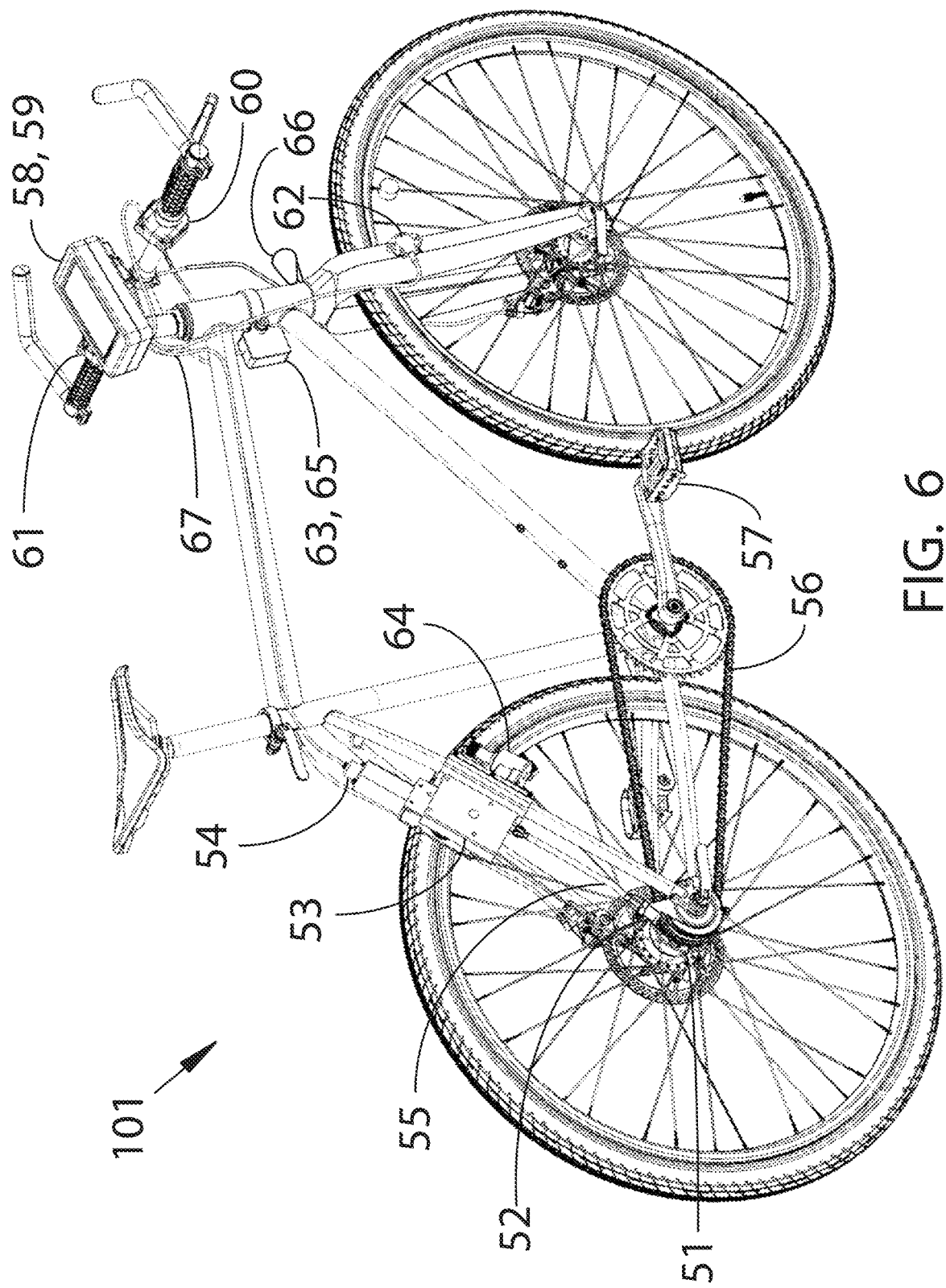
FIG. 6 is a perspective overall view of the systems and components comprising the first alternate embodiment of the automatic bicycle shifter and learn user interface of the present invention.

Preferred Embodiment Controls—FIG. 5

With reference to FIG. 5, the preferred embodiment of the automatic bicycle shifter and learn user interface of the present invention includes Control system 14 comprising steady power supply rechargeable battery pack 27, pulse width modulation (PWM) amplifier 28 and a controls section 29 comprising processor 30, video driver 31, random access memory (RAM) 32, oscillator/counters/timers subsection 33, analog to digital converter (ADC) subsection 34, and power filter 35, acting as an integral system serving to execute programming instructions received through universal serial (USB} programming port 36 and stored into electrically erasable programmable read only memory (EEPROM) 37 in order to control pulse width modulation (PWM) output terminals 38 in response to analog signals received through analog to digital (ADC) input terminals 39 and real time operator instructions from touchscreen display input terminals 40, display real time status through touchscreen display output terminals 41 with consumed power constantly being replenished through power terminals 42. Software updates to touchscreen display 13 and controls system 14 executed through programming terminal 43 are not limited to archiving existing user settings, downloading other users settings, installation of alternate user interfaces and patches geared to continually improve system performance of pulse width modulation (PWM) outputs 44 in response to inputs 45 of rear derailleur 10, front derailleur 11, chain movement sensor 12, rear derailleur manual shifting switches 15, front derailleur manual shifting switches 16, GPS Altimeter 17, Accelerometer 24, hot wire Anemometer 25, bicycle speed input signal received through dynamo voltage divider 46 and improved conservation of power received from power source dynamo 18. WIFI Transceiver 47 with bidirectional communication to control section 29 through RS-232 terminals 48 facilitates alternate control of the preferred embodiment of the automatic bicycle shifter and learn user interface of the present invention through cellular phone 49 running a custom user interface and application communication software 50.

First Alternate Embodiment Construction—FIGS. 6-9

With reference to FIGS. 6-9, the first alternate embodiment 101 of the automatic bicycle shifter and learn user interface of the present invention comprises geared rear hub 51 actuated through shifting cable coupling 52 slaved to shifting cable servo actuator 53 making use of position encoder 54 for controlled draw of sheathed pull cable assembly 55 thereby providing different available power transmission ratios of gear hub 51 through chain 56 to bicycle pedals assembly 57, touchscreen display 58, control system assembly 59, geared rear hub manual and override electric shifting switches 60, geared rear hub manual and automatic selection electric shifting switch 61, bicycle speed sensor 62, GPS Altimeter 63, dynamo 64 serving as controls system expended power replenishment means, forward motion Accelerometer 65 serving to provide acceleration data to control system 59, and hot wire Anemometer 66 serving to provide wind speed data to control system 59. Partially shown wiring harness 67 serves to interconnect touchscreen display 58 to control system assembly 59, manual electric shifting switches 60, manual and automatic electric selection switches 61, bicycle speed sensor 62, GPS Altimeter 63, dynamo 64, forward motion Accelerometer 65, hot wire Anemometer 66, shifting cable servo actuator 53 and encoder 54.

Applicant stresses again that although forward motion Accelerometer 65 is being referred to as a hardware component undoubtedly comprising a best implementation thereof, a software solution based on differentiation of signal of bicycle speed sensor 62 is also plausible and would thereby serve the same purpose. Therefore, the term "Accelerometer" 65 is being loosely used throughout this disclosure denoting either a hardware device producing a signal in known relationship to the change in speed of the bicycle or a software implementation of differentiation of the speed sensing means of the bicycle.

Applicant additionally stresses again that although hot wire Anemometer 66 offers the best solution for net wind speed measurement, other less costly devices based on a mechanical propeller means are available and thereby could serve the same purpose. Therefore, the term "hot wire Anemometer" 66 is also being loosely used throughout this disclosure with the term referring to an actual "how wire Anemometer" or a "wind speed sensing means".

Figure 7:
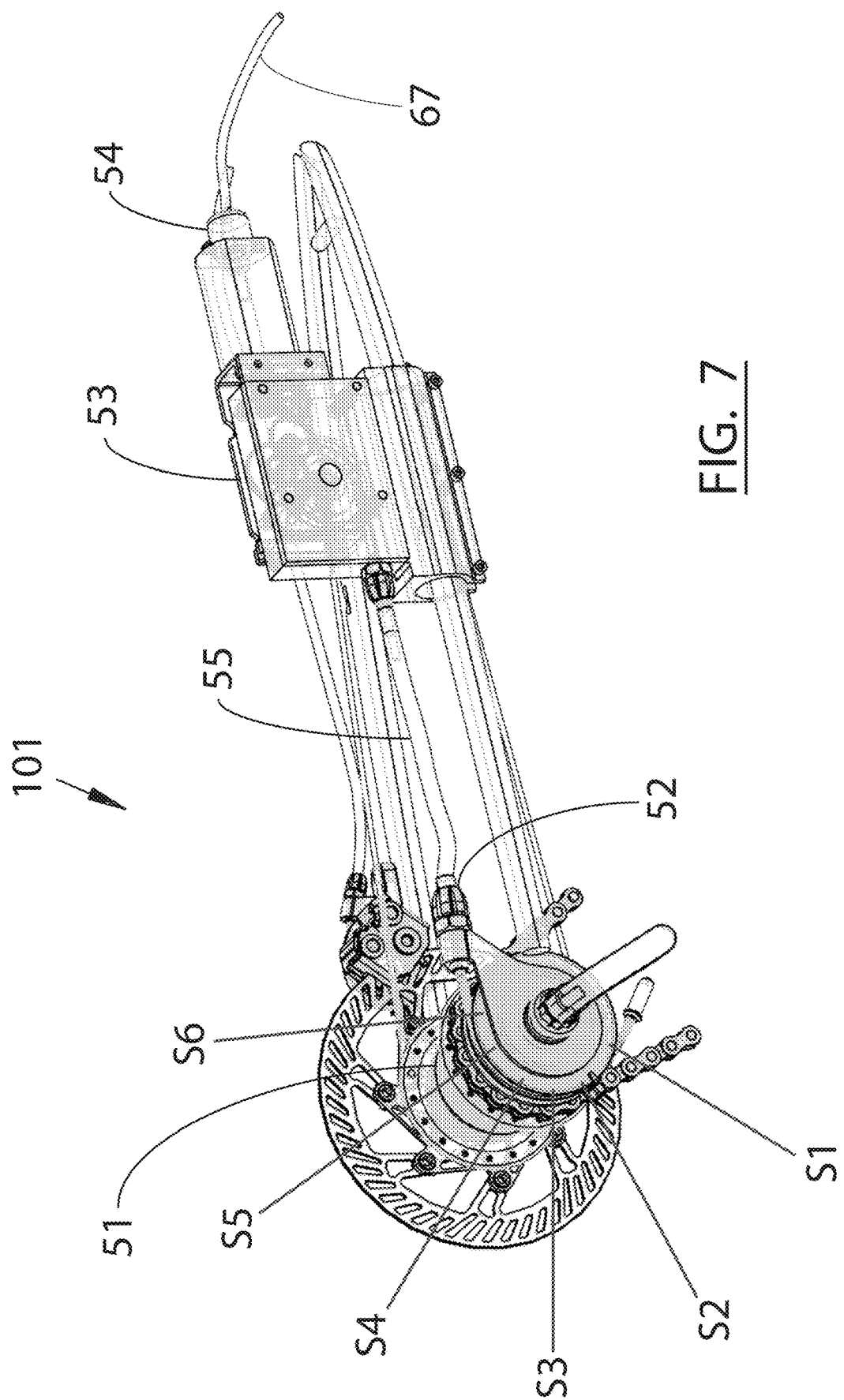
FIG. 7 is a perspective view of the novel shifting cable servo actuator apparatus of the first alternate embodiment of the automatic bicycle shifter and learn user interface of the present invention connected to a common gearhub.
Figure 8:
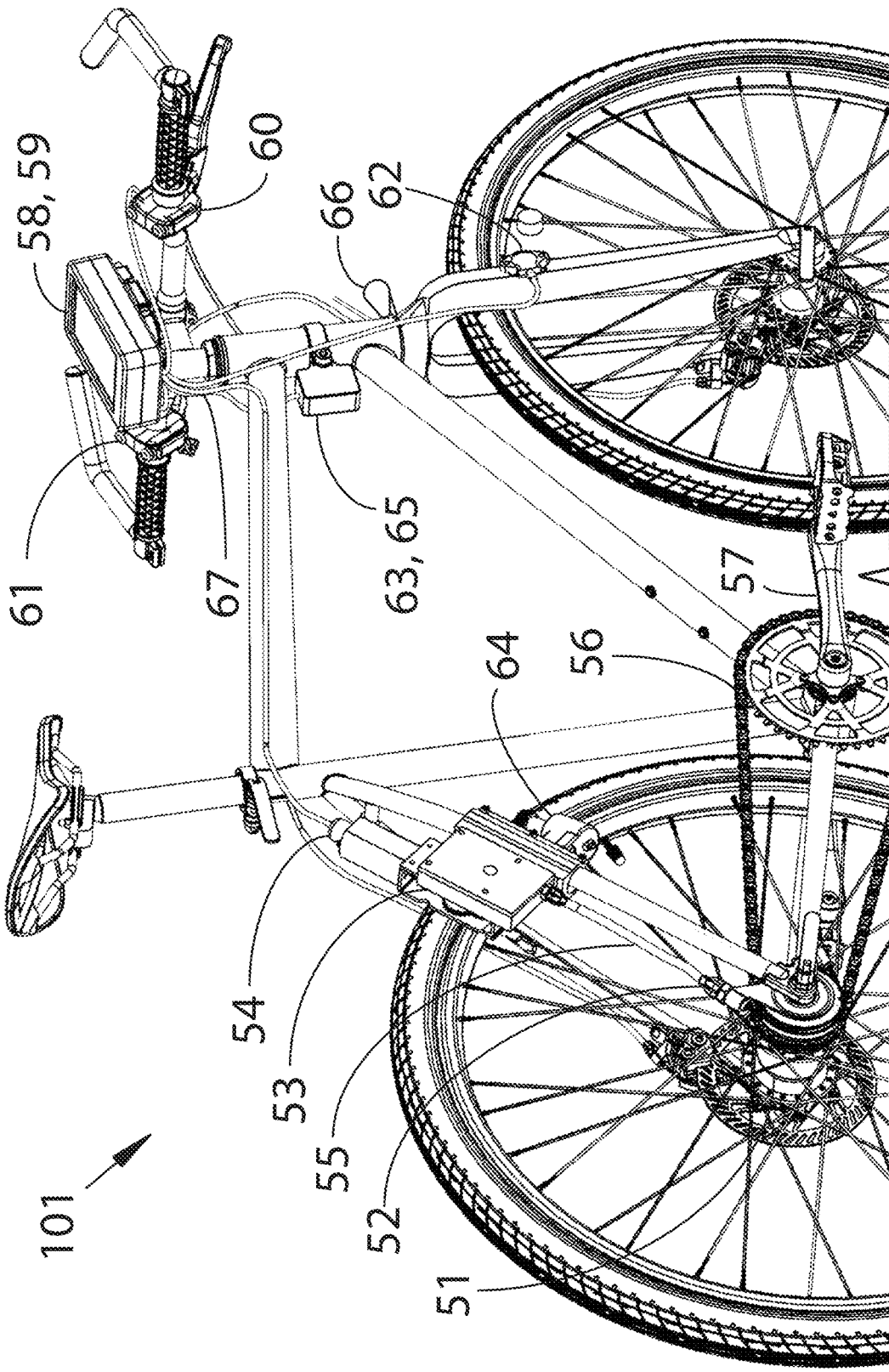
FIG. 8 is a closeup oblique view of the control components, actuation device, touchscreen display and override hardwired switches of the first alternate embodiment of the automatic bicycle shifter and learn user interface of the present invention.

FIG. 7 depicts angular positions denoted S1 through S6 of shifter cable coupling 52 for geared rear hub 51 depicted in this illustration as a six speed hub. Applicant additionally stresses that no limit exists on the number of speeds geared rear hub 51 could alternately have due to shifting cable servo actuator 53 infinitesimal actuation capability with the only limitation being having sufficient travel to cover a smaller or larger actuation range thereof.

Figure 9:
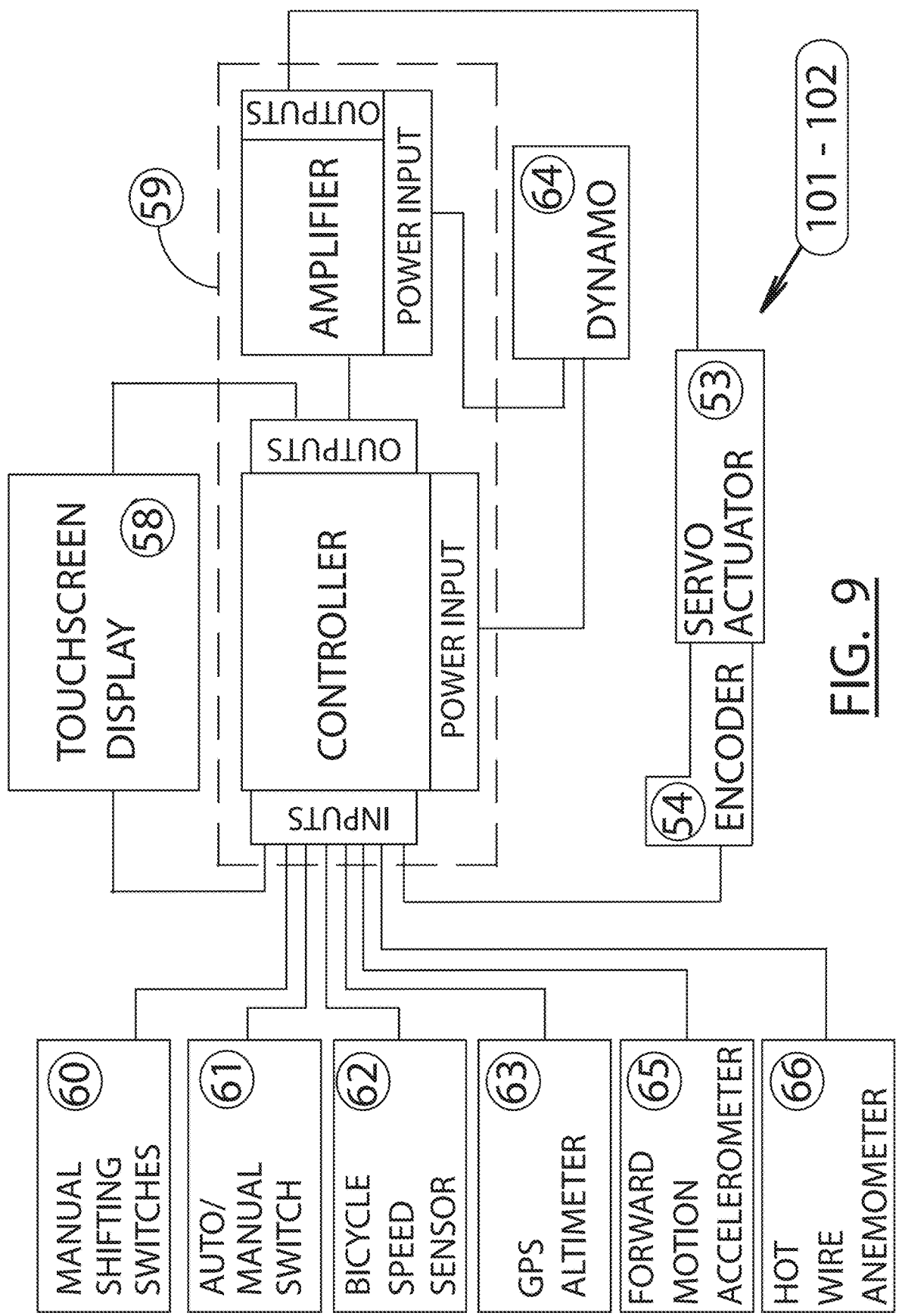
FIG. 9 is a block diagram of the control system and components of the alternate embodiments of the automatic bicycle shifter and learn user interface of the present invention.
Figure 10:
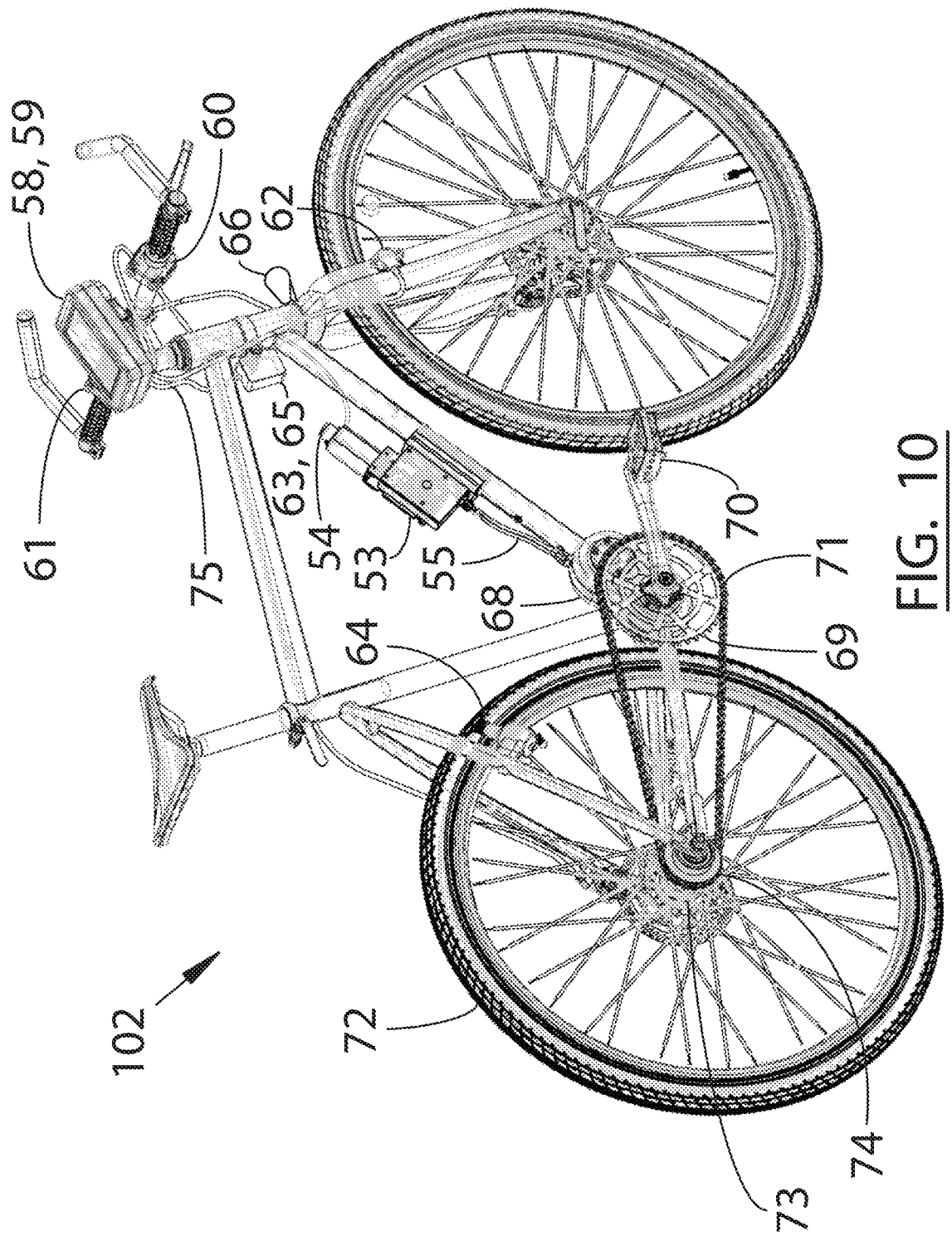
FIG. 10 is a perspective view of the second alternate embodiment of the automatic bicycle shifter and learn user interface of the present invention.

Second Alternate Embodiment Construction—FIGS. 9 & 10

With reference to FIGS. 9 & 10, the second alternate embodiment 102 of the bicycle shifter and learn user interface of the present invention comprises bicycle pedals energized gearbox 68 serving to actuate at different ratios drive chain sprocket 69 slip fit to bicycle pedals assembly 70 and permanently engaging bicycle drive chain 71 serving to energize rear bicycle wheel 72 through freewheel hub 73 through forward ratcheting sprocket assembly 74 with gearbox 68 slaved to shifting cable servo actuator 53 making use of position encoder 54 for controlled draw of sheathed pull cable assembly 55 serving to shift gearing of gearbox 68 thereby facilitating different available power transmission drive ratios between bicycle pedals assembly 70 and drive chain sprocket 69 per rider instructions issued through touchscreen display 58, gearbox manual override electric shifting switches 60, gearbox manual and automatic electric selection switch 61, and processed by control system assembly 59 along with additional data received from bicycle speed sensor 62, GPS Altimeter 63, forward motion Accelerometer 65, and hot wire Anemometer 66, with dynamo 64 serving as controls system expended power replenishment means. Partially shown wiring harness 75 serves to interconnect control system assembly 59 to touchscreen display 58, manual electric shifting switches 60, manual and automatic electric selection switch 61, bicycle speed sensor 62, GPS Altimeter 63, forward motion Accelerometer 65, dynamo 64, hot wire Anemometer 66, shifting cable servo actuator 53 and encoder 54.

Figure 11:
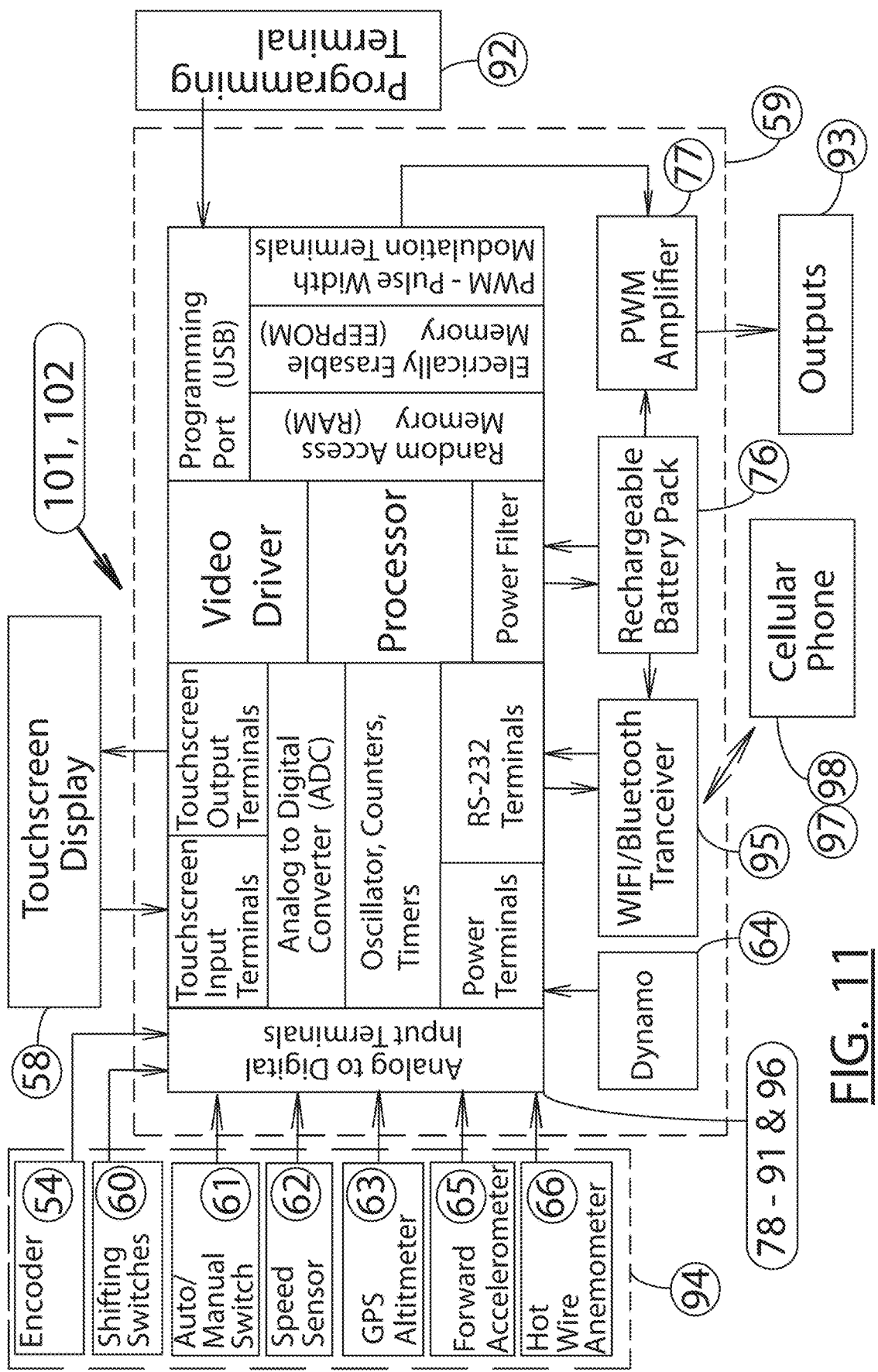
FIG. 11 is a block diagram of the controller of the alternate embodiments of the automatic bicycle shifter and learn user interface of the present invention.

Alternate Embodiment Controls—FIG. 11

With reference to FIG. 11, the alternate embodiments of the automatic bicycle shifter and learn user interface of the present invention include Control system assembly 59 comprising steady power supply rechargeable battery pack 76, pulse width modulation (PWM) amplifier 77 and a controls section 78 comprising processor 79, video driver 80, random access memory (RAM) 81, oscillator/counters/timers subsection 82, analog to digital converter (ADC) subsection 83, and power filter 84, acting as an integral system serving to execute programming instructions received through universal serial (USB} programming port 85 and stored into electrically erasable programmable read only memory (EEPROM) 86 in order to control pulse width modulation (PWM) output terminals 87 in response to analog signals received through analog to digital (ADC) input terminals 88 and real time operator instructions from touchscreen display input terminals 89, display real time status through touchscreen display output terminals 90 with consumed power constantly being replenished through power terminals 91. Software updates to controls system 59 and touchscreen display 58 executed through programming terminal 92 are not limited to archiving existing user settings, downloading other users settings, installation of alternate user interfaces and patches geared to continually improve system performance of pulse width modulation (PWM) outputs 93 in response to inputs 94 received from gearbox manual and override electric shifting switches 60, gearbox manual and automatic electric selection switch 61, bicycle speed sensor 62, encoder 54, GPS Altimeter 63, forward motion Accelerometer 65, hot wire Anemometer 66, and improved conservation of power received from power source dynamo 64. WIFI/Bluetooth Transceiver 95 with bidirectional communication to control section 78 through RS-232 terminals 96 facilitates alternate control of the alternate embodiments 101 & 102 of the automatic bicycle shifter and learn user interface of the present invention through cellular phone 97 running a custom user interface and application communication software 98.

Figure 12:
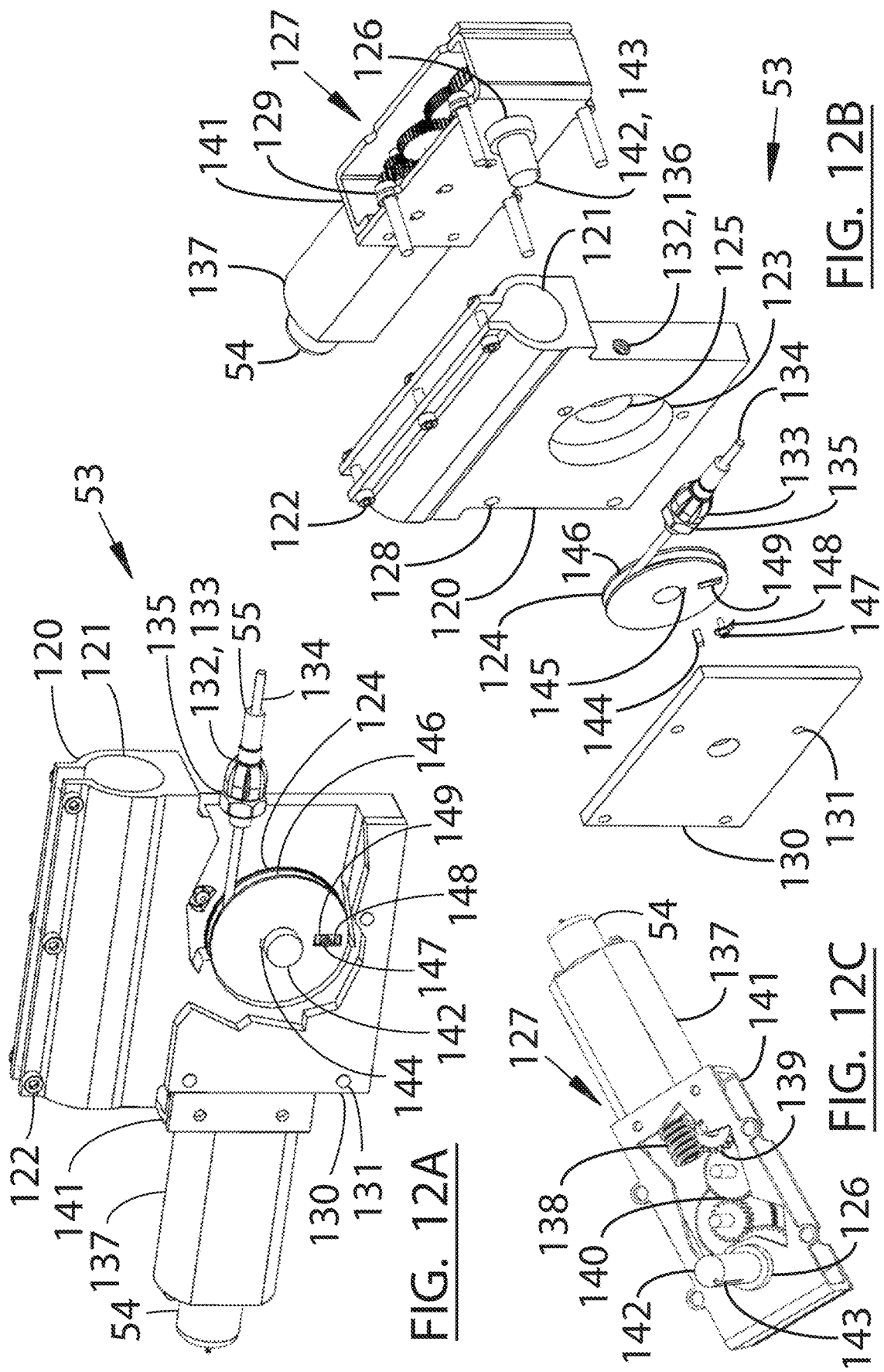
FIG. 12A is a perspective view of the novel shifting cable servo actuator of the alternate embodiments of the automatic bicycle shifter and learn user interface of the present invention.
FIG. 12B is an exploded view of the novel shifting cable servo actuator of the alternate embodiments of the automatic bicycle shifter and learn user interface of the present invention.
FIG. 12C is perspective view of the preferred servo gearbox of the actuator of the alternate embodiments of the automatic bicycle shifter and learn user interface of the present invention

Alternate Embodiments Shifting Cable Servo Actuator—FIGS. 12A-12C

With reference to FIGS. 12A-12C, the preferred embodiment of the shifting cable servo actuator 53 of alternate embodiments 101 and 102 of the automatic bicycle shifter and learn user interface of the present invention comprises housing 120 with collapsing cylindrical portion 121 serving to affix housing 120 to bicycle frame (not shown) by screws 122, cylindrical cavity 123 and slip fitting cable pulley 124 rotationally operable thereof, concentric through bore 125 thereof slip fitting bearing 126 of gearmotor 127, and through holes 128 slip fitting gearmotor fastening screws 129 serving to secure gearmotor 127 to housing 120 by means of cover 130 through cover tapped holes 131. Housing 120 further includes tapped bore 132 for attachment of cable tensioning fitting 133 for tensioning of actuation cable 134 of sheathed cable assembly 55 thereof by means of tensioning nut 135 and inline through passage 136 for actuation cable 134 of sheathed cable assembly 55 into housing cylindrical cavity 123. Gearmotor 127 comprises electric motor 137, with free armature end affixed to encoder 54 and actuation end affixed to worm 138 acting through worm gear 139 of quadruple reduction gearing 140 disposed within housing 141, serves to actuate output shaft 142 with keyslot 143 tightly fitting key 144 for positive rotation actuation of cable pulley 124 through keyslot 145 thereof also accurately fitting key 144. Cable pulley 124 further includes circular cable groove 146 slip fitting actuation cable 134 rotationally retained thereto by means of screw 147 and clamp 148 through side window 149. Encoder 54 permits controlled actuation of motor 137 acting through worm 138 and worm gear 139 of quadruple reduction gearing 140 in turn energizing output shaft 142 which through key 144 serves to rotationally actuate cable pulley 124 thereby facilitating forward and reverse actuation of actuation cable 134 depending on direction of rotation of armature of motor 137. Selection of a proper reduction ratio of worm 138 and worm gear 139 permits inhibiting reverse actuation of this gearset resulting in sole possible actuation being that of worm gear 139 through worm 138 through motor 137 and thereby any motion of shaft 142 being solely contingent upon actuation of motor 137. In other words, shaft 142 and by extension cable pulley 124 and consequently actuation cable 134 will hold actuated position regardless of extraneous forces thereby permitting holding of shift position of actuated device notwithstanding any tension forces applied to shifting cable servo actuator 53 through actuation cable 134 for as long as motor 137 holds position.

Applicant additionally stresses that although the disclosed device makes use servo motor acting through a quadruple reduction gearset, other gearbox ratios and actuation devices such as stepping or microstepping electrical motors capable of holding commanded positions would also serve the same purpose. Therefore, gearbox 127 is additionally being loosely used throughout this disclosure denoting a servo motor acting through an multi speed gearbox or a stepping or microstepping motor with output shaft thereof directly affixed to pulley 124.

Figure 13:
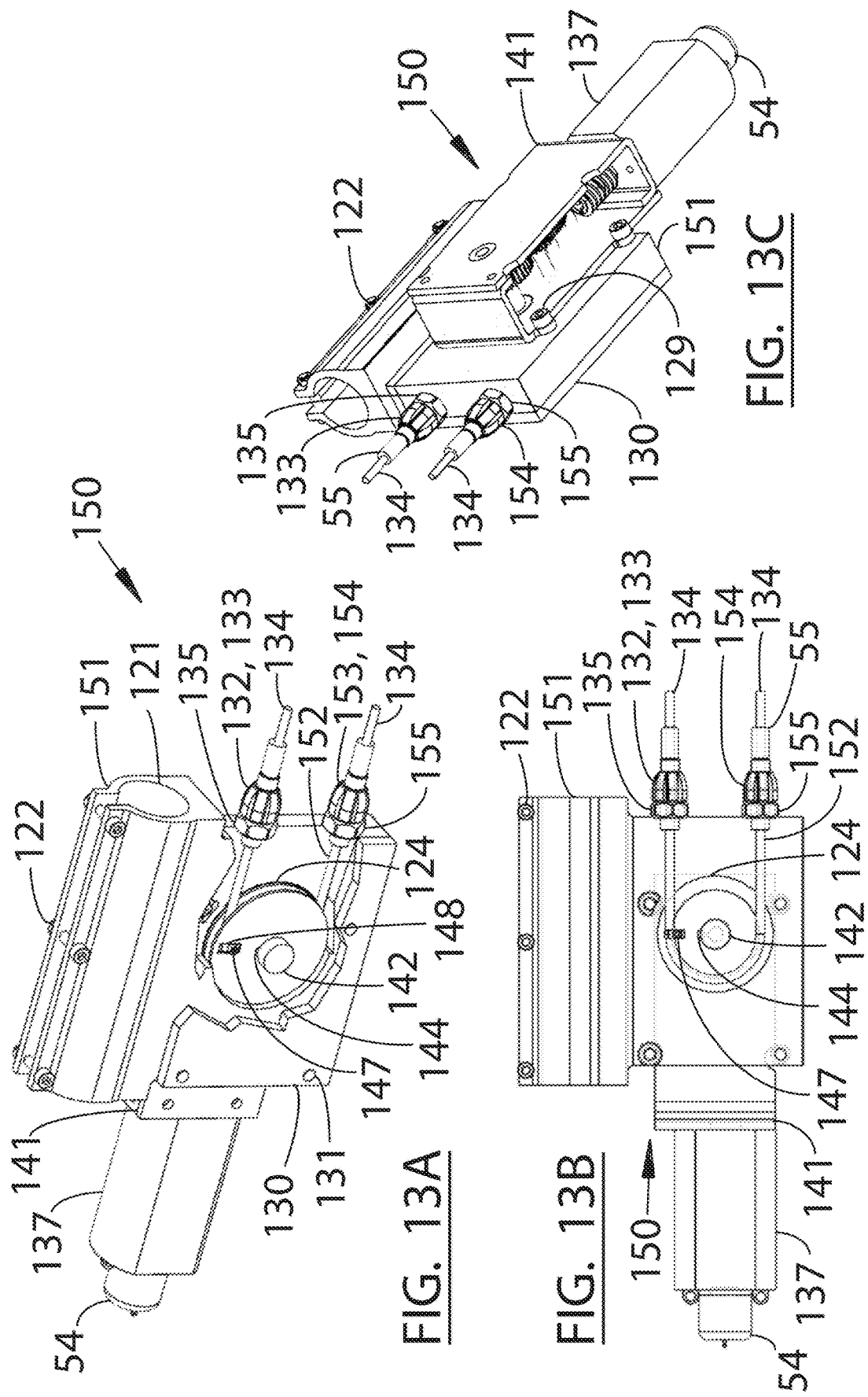
FIG. 13A is a perspective view of the novel double shifting cable servo actuator of the alternate embodiments of the automatic bicycle shifter and learn user interface of the present invention.
FIG. 13B is a side view of the novel double shifting cable servo actuator of the alternate embodiments of the automatic bicycle shifter and learn user interface of the present invention.
FIG. 13C is an oblique view of the novel double shifting cable servo actuator of the alternate embodiments of the automatic bicycle shifter and learn user interface of the present invention.

Alternate Embodiments Double Shifting Cable Servo Actuator—FIGS. 13A-13C.

With reference to FIGS. 13A-13C, the preferred embodiment of the double shifting cable servo actuator 150 alternately employed by the alternate embodiments of the automatic bicycle shifter and learn user interface of the present invention, depending on powertrain design thereof, is predominantly similar in construction to shifting cable servo actuator 53 with actuation cable 134 further extending from opposite end of cable pulley 124 through housing 151, an exact replica of housing 120 of servo actuator 53 with additional passage 152 for actuation cable 134 of sheathed cable assembly 55, tapped bore 153 and thereto mounted cable tensioning fitting 154 for tensioning of actuation cable 134 by means of tensioning nut 155 and finally extending through sheathed cable assembly 54 to actuated device. As shifting cable 134 is affixed to cable pully 124, any rotational motion thereof results in a linear motion of actuation cable 134 extending from tensioning fitting 133 in one direction and an equal linear motion of actuation cable 134 extending from tensioning fitting 154 in the opposite direction. This type of push/pull shifting cable arrangement is geared toward certain gearhub and bicycle transmission devices relying a double cable arrangement to alleviate reliance on springs to keep actuation cable taught. This disclosure further stresses that aside from the double cable arrangement of double shifting cable servo actuator 150, all construction provisions thereof are a mere duplication of those of shifting cable servo actuator 53.

Applicant stresses again that although the disclosed device makes use servo motor acting through a quadruple reduction gearset, other gearbox ratios and actuation devices such as stepping or microstepping electrical motors capable of holding commanded positions would also serve the same purpose. Therefore, gearbox 127 is additionally being loosely used throughout this disclosure denoting a servo motor acting through an multi speed gearbox or a stepping or microstepping motor with output shaft thereof directly affixed to pulley 124.

Preferred and Alternate Embodiment User Interface—FIGS. 14-17.

With reference to FIGS. 14-17, touchscreen display 13 of the preferred embodiment of the automatic bicycle shifter and learn user interface of the present invention includes "Teach Mode" selection button 201 used to enter into "Teach Mode" operator screen 202, "Programming Mode" selection button 203 used to enter into "Programming Mode" operator screen 204, "Operation Mode" selection button 205 used to enter into "Operation Mode" operator screen 206, and "Learn Mode" selection button 207 used to enter into "Operation Mode" operator screen 208.

Figure 14:
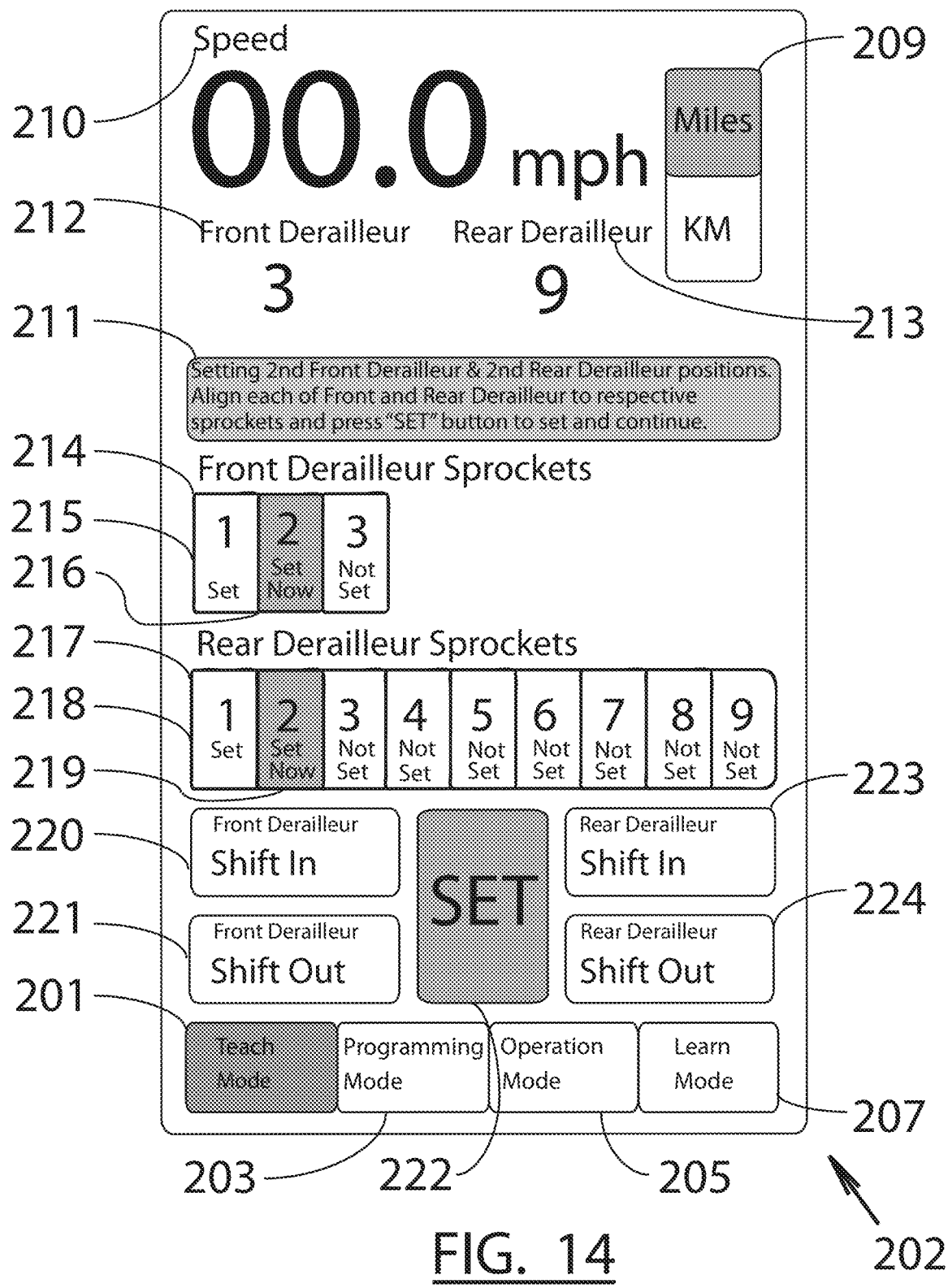
FIG. 14 is a view of the preferred operator panel "Teach Mode" user interface of the preferred embodiment of the automatic bicycle shifter and learn user learn interface of the present invention.

With reference to FIG. 14, touchscreen display 13 of the preferred embodiment of the automatic bicycle shifter and learn user interface of the present invention in "Teach Mode" operator screen 202 entered into by depressing button 201 after removal of bicycle drive chain for maximum visibility allows the user to define number of front derailleur shift positions, rear derailleur shift positions, align defined front derailleur shift positions to respective front sprockets and align defined rear derailleur shift positions to respective rear sprockets. "Teach Mode" screen operator screen includes speed selection button 209 enabling user to select speed and distance units in Miles or kilometers (KM), bicycle speed display 210, user prompt window 211 used in "Teach Mode" screen 202 to walk user through setup initially prompting user for number of front derailleur sprockets entered through window 212 initially displaying a value of "1" and incrementing with each user tap to window 212 until the correct number of front derailleur sprockets is displayed followed by user tapping window 211 for entry thereof, number of rear derailleur sprockets entered through window 213 also initially displaying a value of "1" and incrementing with each user tap to window 213 until the correct number of rear derailleur sprockets is displayed followed by user tapping window 211 for entry, with window 211 subsequently walking user through setting of front derailleur sprockets alignment positions as depicted in window 214 reflecting number of front derailleur sprocket positions defined through window 212, with defined front sprockets alignment positions 215 depicting text "Set" and with front sprocket alignment position being defined 216 in gray highlight background and depicting text "Set Now" and front derailleur sprocket alignment positions yet to be set depicting text "Not Set", and rear derailleur sprockets alignment positions depicted in window 217 reflecting number of rear derailleur sprocket positions defined through window 213, with defined rear derailleur sprockets alignment positions 218 depicting text "Set" and rear derailleur sprocket alignment position being defined 219 in gray highlight background and depicting text "Set Now" and rear derailleur sprocket alignment positions yet to be defined depicting text "Not Set", front derailleur "Shift In" button 220 and front derailleur "Shift Out" button 221 used to inch or adjust through lateral movement of front derailleur into accurate alignment with respective sprocket for front derailleur position being defined in window 216 prior to user depressing "SET" button 222 to set, rear derailleur "Shift In" button 223 and rear derailleur "Shift Out" button 224 used to inch or adjust through lateral movement of rear derailleur into alignment with respective sprocket for rear derailleur position being defined in window 219 prior to depressing "SET" button 222 to set. Once a front or rear sprocket position is set, user prompt window 211, front derailleur sprocket position window 216, rear derailleur sprocket position window 219, front derailleur status window 214 and rear derailleur status window 217 all update to guide user through setting of following front and rear derailleur sequential sprocket position with process continuing until all sprocket positions depicted in front derailleur sprockets position window 214 and all rear derailleur sprockets position depicted in window 217 are defined. Once all front and rear derailleur sprocket positions are defined, prompt window 211 instructs user to replace the bicycle drive chain and depress button 203 to enter into "Programming Mode".

Figure 15:
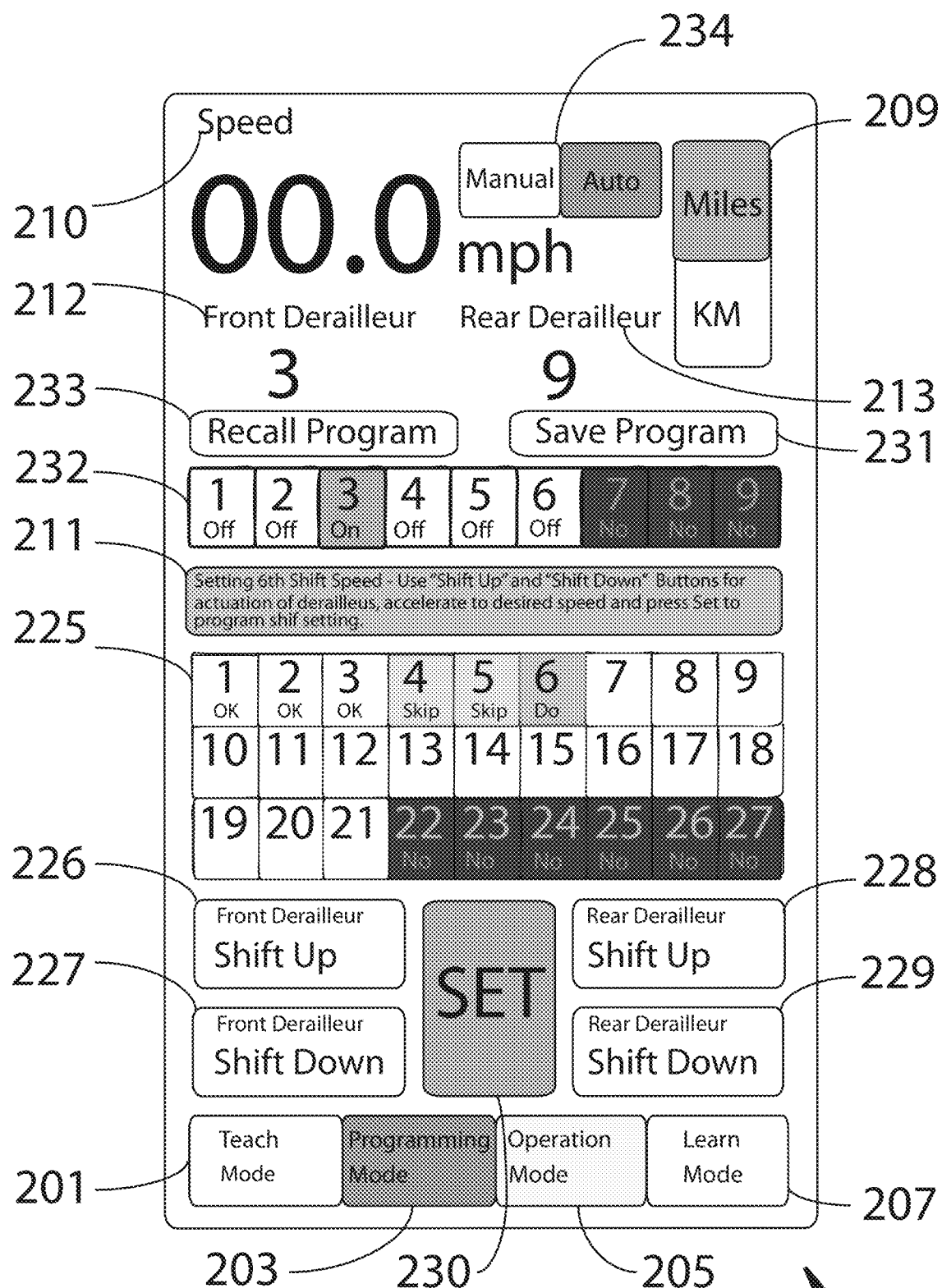
FIG. 15 is a view of the preferred operator panel "Programming Mode" user interface of the preferred embodiment of the automatic bicycle shifter and learn user interface of the present invention.

With reference to FIG. 15, touchscreen display 13 of the preferred embodiment of the automatic bicycle shifter and learn user interface of the present invention in "Programming Mode" operator screen 204 entered into by depressing button 203 comprises bicycle miles or kilometers (KM) units selection button 209, bicycle speed display window 210, front derailleur position window 212, rear derailleur position window 213, aforementioned user prompt window 211 serving in "Programming Mode" to walk the user through derailleur programming initially prompting the user to define the number of desired "Shift Speeds" entered by depressing desired number displayed in window 225 encompassing all possible shifter combinations based on user input of number of front derailleur and rear derailleur sprocket positions previously defined in "Teach Mode" and initially all displayed in an disabled black background and carrying text "No" with user input subsequently causing all desired "shift speeds" backgrounds to turn to white denoting availability for programming. User prompt window 211 subsequently prompts the user to program all "shift speeds" sequentially starting with "shift speed" "1" in turn denoted in window 225 by text "Do" and is highlighted with a gray background which the user then programs by defining a certain shift combination while riding and depressing front derailleur "Shift Up" button 226, front derailleur "Shift Down" button 227, rear derailleur "Shift Up" button 228 and rear derailleur "Shift Down" button 229 with window 212 prompting user with front derailleur sprocket position being set and window 213 prompting user with rear derailleur sprocket position being set. Once selection of a "shift speed" and respective front and rear derailleur selections are engaged, user accelerates or decelerates until desired shift speed thresholds as displayed in speed display window 210 is reached and then depresses programming speed "SET" button 230 to set which then results in denoted text for respective programming "shift speed" in window 225 to switch from "Do" to "Ok" with window 225 subsequently indexing to following sequential position which is then denoted by text "Do" for programming, with the process repeating sequentially until all desired "shift speeds" in window 225 are set. Additionally, the user is granted functionality to limit the number of programmed speeds at will through this same procedure to potentially skip sprocket combinations from programming and thereby from being employed altogether. In order to skip sprocket combinations, user depresses a speed adjacent to button denoted by "Do" with action causing speed in "Do" button as well as adjacent buttons all the way to depressed button to be denoted by "Skip" with depressed button then denoted by "Do" as depicted in skipped buttons 4 and 5 in window 225 with user having depressed button 6 immediately after button 3 was set. User depresses "Save Program" button 231 to save programmed shift positions in window 225 at any time by subsequently depressing any of available programming button positions in window 232 initially all depicted in a disabled black background and denoted by text "No" and which upon saving turn to gray highlight and are depicted with text "On" and with already programmed program buttons denoted by text "Off" with white background. Program saving feature thereby enables user to save different riding profiles, such as casual riding, speed riding, racing, etc. . . . or with additional simplified profiles making use of only the front or the rear derailleur and/or reduced combination sets thereof. "Recall Program" button 233 followed by program selection from window 232 is used to recall any saved programs for modification or reprogramming by subsequently depressing any of "shift speeds" in window 225 for redefinition using the same procedure employed in initial programming. User is additionally granted the ability to test programmed speeds by switching to automatic shift through selection button 234 initially defaulting to "manual" for programming of shift speed positions. For maximum flexibility, no restriction is placed on the number of shift combinations, repetition of shift combinations, skipped combinations or the number of programmed shift positions as displayed in window 225 prior to the user being able to enter into operation screen 206 by depressing button 205.

As it is often desired to vary the shifting speed threshold depending on whether the bicycle is accelerating or decelerating, upon rider depressing set button 230, the shifting speed is compared to last shifting speed and if higher, the shifting speed threshold is applied for both acceleration as well as deceleration. If the shifting speed is lower than last shifting speed, the default deceleration shifting speed thresholds defined in acceleration mode is overwritten for deceleration accordingly.

Figure 16:
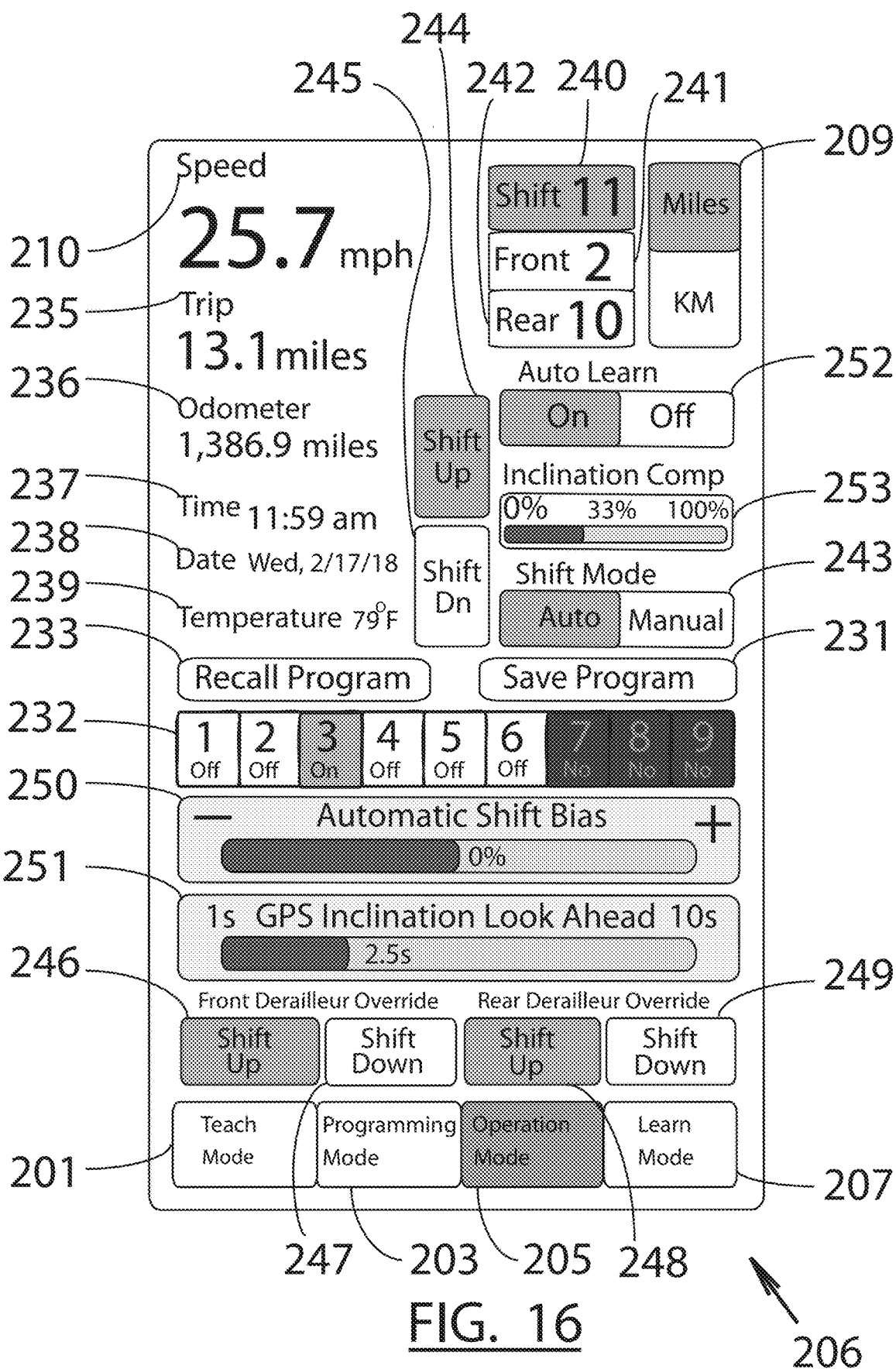
FIG. 16 is a view of the preferred operator panel "Operation Mode" user interface of the preferred embodiment of the automatic bicycle shifter and learn user interface of the present invention.

With reference to FIG. 16, touchscreen display 13 of the preferred embodiment of the automatic bicycle shifter and learn user interface of the present invention in "Operation Mode" operator screen 206 entered into by depressing button 205 comprises bicycle miles or kilometers (KM) units selection button 209, bicycle speed display 210, accumulated trip mileage 235, odometer 236, time 237, date 238, temperature display 239 which defaults to degrees "Fahrenheit" units if miles units are selected through button 209 or degrees "Celsius" units if KM units are selected, recall program button 233 used to activate programs saved through window 232 in "Programming Mode" screen 204 and depicted in window 232 with a white background and denoted with an "Off" designation and which upon activation take on a gray background with an "On" designation with selection buttons not programmed in "Programming Mode" screen 204 displayed in a disabled black background with a "No" designation, save program button 231 used to save any modification to recalled program selection assigned a gray background and denoted by an "On" designation in window 232 through "Auto Learn" mode of "Operation Mode" screen 206, shift setting window 240 depicting current shift position from those defined in window 225 in "Programming Mode" screen 204, front shifter position window 241, rear shifter position window 242, shift mode selection button 243 used to place shifting of the bicycle in automatic or manual mode, shift up override button 244 and shift down override button 245 used to immediately force shifting up or down of speeds defined in window 225 in "Programming Mode" screen 204, front derailleur manual override button 246 used to shift up and override button 247 to shift front derailleur down, and rear derailleur manual override button 248 used to shift up and override button 249 to shift rear derailleur down, all in either automatic or manual mode. "Operation Mode" screen 206 additionally comprises "Automatic Shift Bias" touch control slide bar 250 serving to permit rider to scale up or down programmed speed shifting speed thresholds of programmed shift positions of window 225 of "Programming Screen" 204 by an arbitrary selected percentage on the order of plus/minus 30% for active program selection in window 232 denoted with "On" designation based on own preference in real time, and "Inclination Look Ahead" road inclination touch control slide bar 251 serving to force GPS Altimeter to read road altitude at expected rider location based on rider real time direction and speed in seconds increments of 1 second to an arbitrarily selected 10 seconds to be employed by inclination compensation software algorithm employed by control system 14 for active program selection in window 232 denoted with "On" designation in order to adjust pedaling effort levels based on road inclination in real time.

"Operation Mode" screen additionally includes controls permitting the rider to activate an "Auto Learn" mode through mode selection button 252 which forces control system 14 to track rider shifting commands issued through shift up button 244 and shift down button 245 and alter shifting speed settings defined in programming window 225 of "Programming Mode" screen 204 accordingly through in either an "overwrite" mode or a "weighed average" mode per a selection button to be defined in "Learn Mode" screen 208. The procedure for "Auto Learn" encompasses two conditions the first of which arises when the rider desires to force control system 14 to modify a shift speed setting prior to reaching respective automatic shifting speed setting with the rider thereof depressing the shift up button 244 to shift up and shift down button 245 to shift down to modify that shift setting, and with the second condition arising when the rider desires to modify last automatic shift conducted by control system 14 with the rider within an arbitrary selected time of 2 seconds of the automatic shift depressing the shift up button 244 or the shift down button 245 to force control system 14 to undo last automatic shift and alter respective speed setting per rider subsequent command conducted by depressing either the shift up button 244 or shift down button 245 when the modified desired speed is reached. Rider can additionally enable or disable road inclination compensation altogether through "Inclination Comp" touchscreen bar 253 enabling control of the level of inclination compensation being applied by control system 14 with 100% being fully applied and 0% being completely "off".

Figure 17:
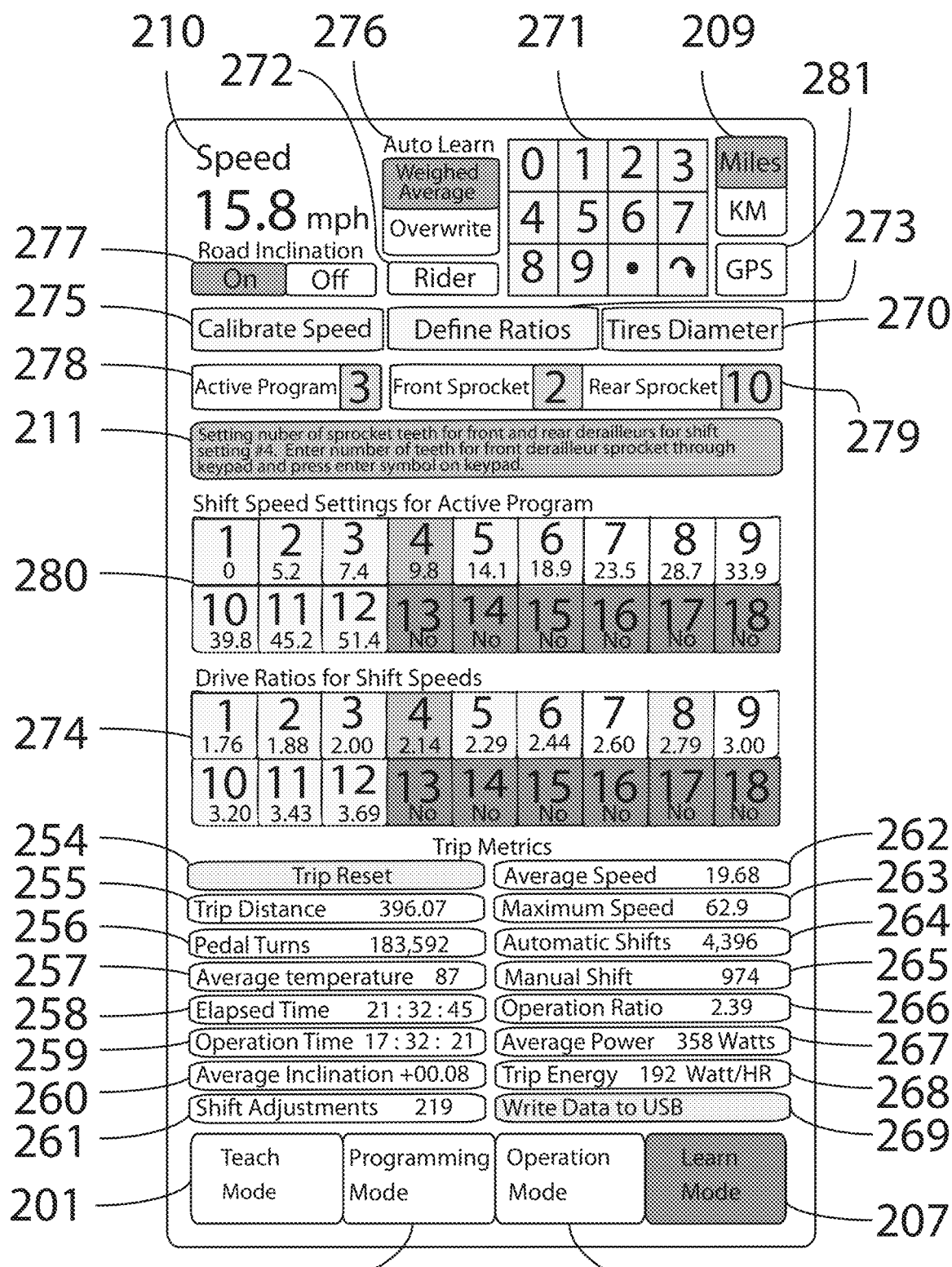
FIG. 17 is a view of the preferred operator panel "Learn Mode" user interface of the preferred and alternate embodiments of the automatic bicycle shifter and learn user interface of the present invention.

With reference to FIG. 17, touchscreen display 13 of the preferred as well as the alternate embodiments of the automatic bicycle shifter and learn user interface of the present invention in "Learn Mode" operator screen 208 entered into by depressing button 207 comprises bicycle miles or kilometers (KM) units selection button 209, bicycle speed display 210, trip reset button 254, and windows depicting various metrics for trip which rider can view through trip distance window 255, total pedal turns window 256, average temperature window 257, elapsed time window 258, operation time window 259, average road inclination window 260, total shift adjustments window 261, average speed window 262, maximum speed window 263, total shifts window 264, total manual shifts window 265, elapsed to operation time ratio window 266, average expended rider power for trip window 267 in Watts, total expended energy for trip window 268 in Watt-Hours, and write data to flash drive button 269 upon rider inserting a flash drive into USB port 36. Additionally, "Learn Mode" operator screen 208 offers the rider shift settings functionality setup with aforementioned window 211 used in "Learn Mode" 208 to guide user through definition of general information to be used by the software of control systems 14 and 59 comprising, tires diameter of the bicycle which the user enters by pressing "Tires Diameter" button 270 which causes window 211 to prompt user to enter the measurement through keypad 271 followed by rider depressing the "enter" button (depicted with an arrow) for entry thereof with entry defaulting to millimeters if button 209 is set to KM and inches if button 209 is set to Miles, rider and bicycle data through "Rider" button 272 causing window 211 to prompt rider to enter own and bicycle weights in sequence using keypad 270 in Kilograms if button 209 is set to KM and lbs. if button 209 is set to Miles followed by additional data to be subsequently used by software dynamics calculations including rider height, inseam and sex also entered through keypad 271 with window 211 also guiding the rider entry thereof, computation of bicycle drive ratio for various speeds through "Define Ratios" button 273 which starts sequence depending on implementation of either the preferred or alternate embodiments of the automatic bicycle shifter and learn user interface of the present invention with that for the preferred embodiment prompting the rider for definition of number of teeth for various front and rear sprockets with window 211 prompting user to select shift speed setting by pressing a certain shift selection in window 274 depicting all shift settings programmed through window 225 of "Programming Mode" screen 204 followed by window 211 prompting rider to enter number of teeth of front sprocket for that selection which rider then enters by pressing digits and return button in keypad 271 with window 211 subsequently prompting user for entry of number teeth for rear derailleur sprocket for that setting with rider entering this information through keypad 271 to complete computation of drive ratio based entered sprocket teeth information and prior entry of tires diameter for that shift setting which subsequently updates under respective speed setting button in window 274 with window 211 prompting rider to enter information for following speed setting with process continuing until drive ratios for all shift settings are defined, and with implementation for the alternate embodiments prompting the rider for entry of gearing ratios and pedals sprocket number of teeth. "Learn Mode" operator screen 208 additionally comprises functionality to enable rider to calibrate speed of bicycle through a known speed device using "Calibrate Speed" button 275 with window 211 subsequently prompting user to accelerate to a known speed and enter bicycle speed using keypad 271, enables rider to enable and select operation of "Auto Learn" mode through selection button 276 which instructs control system 14 to default to a "weighed average" or "overwrite" algorithm for any shift setting updates, enable rider to turn road inclination compensation on or off using "Road Inclination" button 277, prompts rider with current active program through "Active Program" window 278, current front and rear derailleur settings through window 279 for the preferred embodiment and shift setting the alternate embodiments, shift speed settings for current program for all shift speeds programmed in window 225 of "Programming Mode" screen 204 through window 280 with the information being displayed beneath each shift setting. With global positioning system GPS capability within the system, optional "GPS" switch 281 is used to overlay "Learn Mode" user interface 208 with a GPS display (not shown) with GPS return button 282 (not shown) serving to return rider to "Learn Mode" user interface 208.

User Interface Options—FIGS. 14-17

With Reference to FIGS. 14-17 again, the preferred embodiment of the user interface of preferred embodiment of the automatic bicycle shifter and learn user interface of the present invention is fitted for operation with a front and a rear derailleur as modern bicycles are typically equipped. In the event that only either a front or the rear derailleur is employed by the system, user interfaces for "Teach Mode" 202, "Programming Mode" 204 and "Operation Mode" 206 and "Learn Mode" 208 automatically update to reflect controls for only defined derailleur with non-pertinent control buttons defaulting in depiction to disabled black background and are additionally denoted by text "No".

Figure 18:
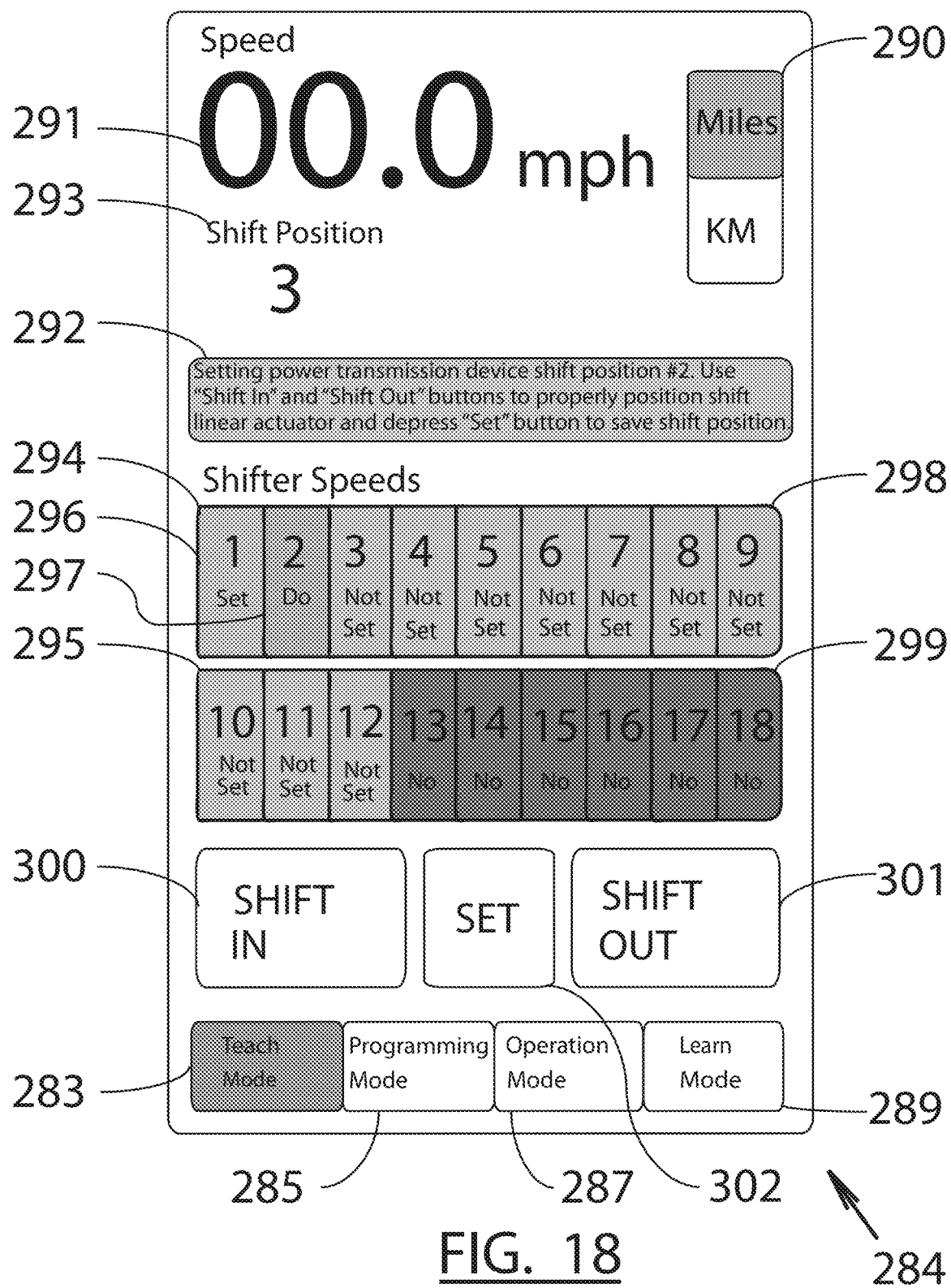
FIG. 18 is a view of the preferred operator panel "Teach Mode" user interface of the alternate embodiments of the automatic bicycle shifter and learn user learn interface of the present invention.
Figure 19:
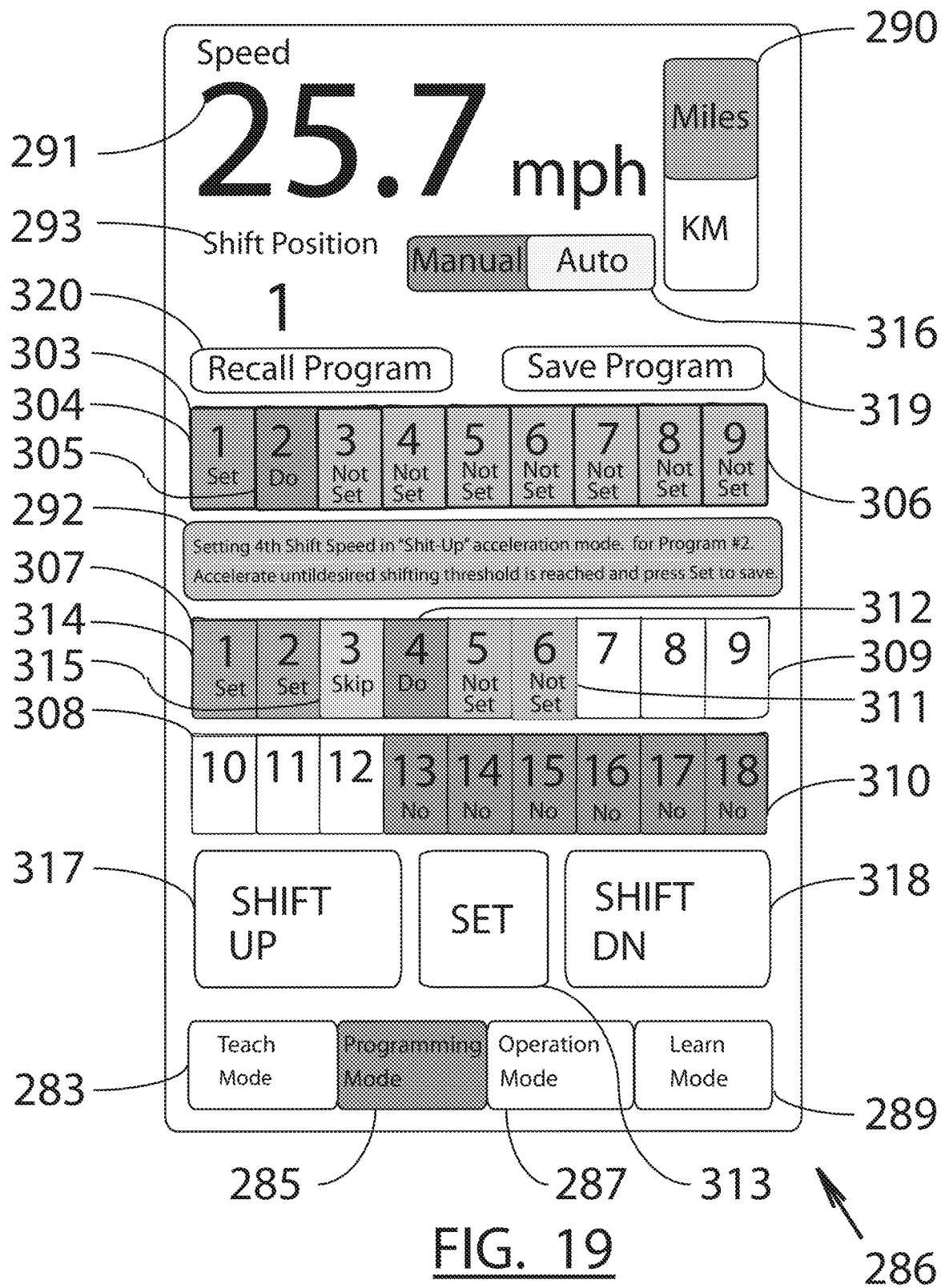
FIG. 19 is a view of the preferred operator panel "Programming Mode" user interface of the alternate embodiments of the automatic bicycle shifter and learn user interface of the present invention.
Figure 20:
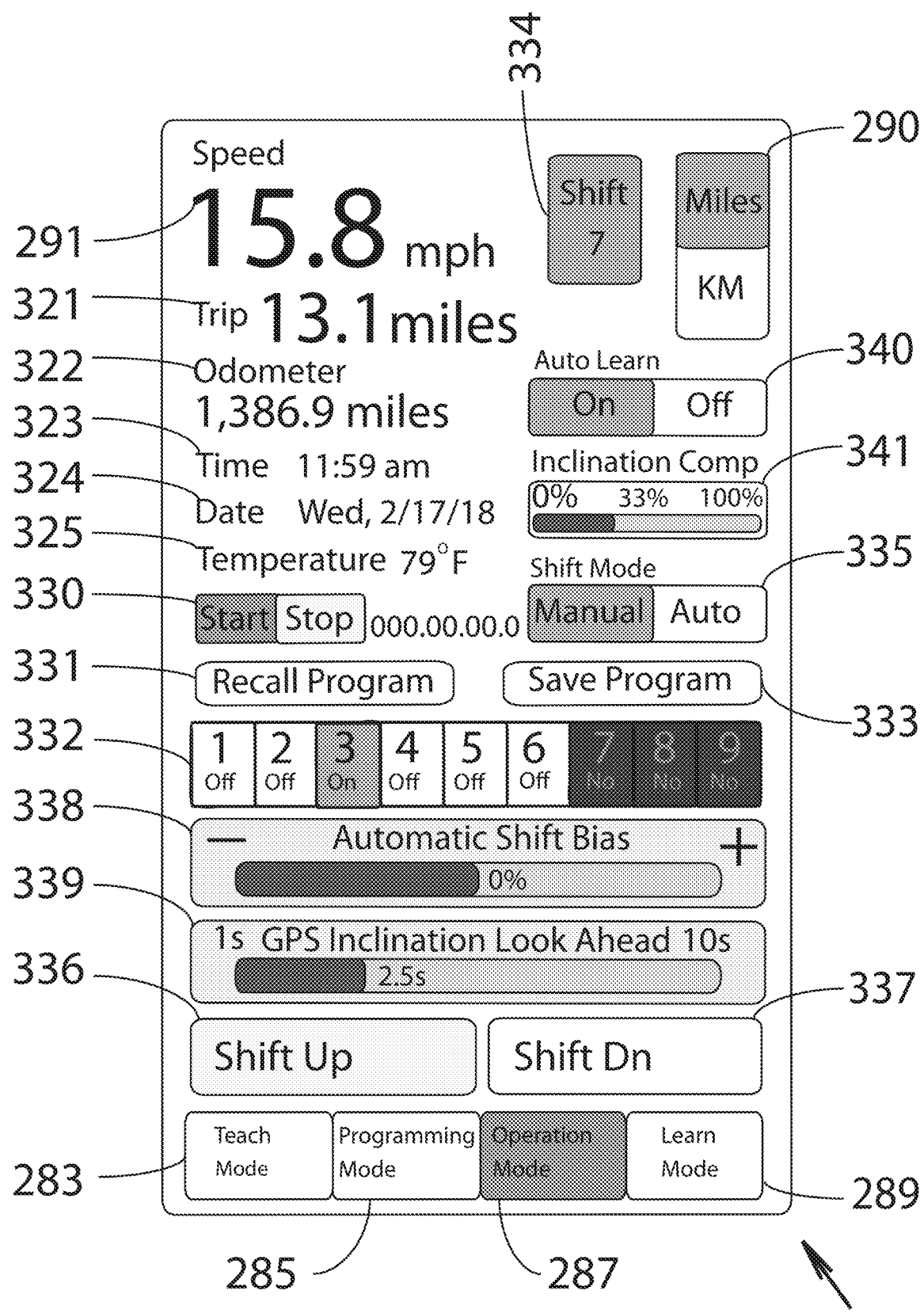
FIG. 20 is a view of the preferred operator panel "Operation Mode" user interface of the alternate embodiments of the automatic bicycle shifter and learn user interface of the present invention.

Alternate Embodiments User Interface—FIGS. 18-20.

With reference to FIGS. 18-20, touchscreen display 58 of the alternate embodiments of the automatic bicycle shifter and learn user interface of the present invention includes "Teach Mode" selection button 283 used to enter into "Teach Mode" operator screen 284, "Programming Mode" selection button 285 used to enter into "Programming Mode" operator screen 286 and "Operation Mode" selection button 287 used to enter into "Operation Mode" operator screen 288, and "Learn Mode" button 289 used to enter into aforementioned "Learn Mode" operator screen 208 equally applicable to the alternate embodiments of the automatic bicycle shifter and learn user interface of the present invention and which upon configuration thereof displays pertinent ratio information in window 279. With henceforth reference of "power transmission device" meaning either geared hub 51 or gearbox 68, the "teaching", "programming" and "operation" of the touchscreen display user interface of the alternate embodiments of the present invention is as follows.

With reference to FIG. 18, touchscreen display 58 of the alternate embodiments of the automatic bicycle shifter and learn user interface of the present invention in "Teach Mode" operator screen 284 entered into either during motion of the bicycle or at a standstill by depressing button 283 allows the user to define number of power transmission device shift positions and accurately position actuation cable 134 of sheathed pull cable assembly 55 through proper actuation of servo linear actuator 53 for each available or desired shift position with encoder 54 providing positional feedback to control system 59. "Teach Mode" operator screen includes speed selection switch 290 enabling user to select speed and distance units in Miles or kilometers (KM), bicycle speed display 291 defaulting to miles or kilometers depending on setting of switch 290, user prompt window 292 used in "Teach Mode" screen 284 to walk user through shifting setup prompting user for number of desired power transmission device speeds entered through window 293 initially displaying a value of "1" and incrementing with each user tap to window 293 until the correct number of power transmission device speeds is displayed followed by user tapping window 292 for entry thereof, with window 292 subsequently walking user through setting of power transmission device actuation positions as depicted in windows 294 and 295 reflecting number of power transmission device shift positions defined through window 293, with defined power transmission device shift positions 296 depicting text "Set" in green background highlight and with power transmission device shift position being defined 297 in gray background highlight and depicting text "Do", power transmission device shift positions yet to be set 298 depicting text "Not Set" in amber background highlight and with shift positions exceeding number of shift position defined by the user for power transmission device 299 in dark ray highlight and depicting text "No". User can alternately enter number of desired speeds of power transmission device by simply depressing proper number displayed in windows 294 and 295 rather than tapping window 293 with this action causing windows 294 and 295 to reflect user preference as just defined. "Shift In" button 300 and "Shift Out" button 301 are used to forward and reverse actuate servo linear actuator 53 in order to accurately position actuation cable 134 of sheathed pull cable assembly 55 for position being defined in window 297 prior to user depressing "SET" button 302 to set, an action causing reading from encoder 54 to be stored into (EEPROM) memory 86 of control system assembly 59. Once a shift position is set, user prompt window 292 and power transmission device position windows 293, 294, 295, 296 and 297 all update to guide user through setting of following power transmission device shift position with process continuing until all desired shift positions depicted in shift position windows 294 and 295 are defined. Once all power transmission device shift positions are defined, prompt window 292 instructs user to depress button 285 to enter into "Programming Mode". For maximum versatility the rider is able to define any arbitrary number for the number of shift positions allowing certain shift positions not desired by the rider to be skipped altogether. With redundant shift positions being not desirable, the arbitrary number of shift positions defined by the rider must be equal or less than the number of available shift position of the power transmission device of the bicycle with no two shift positions having exact actuation settings.

Additionally, in order to account for geared power transmission device hysteresis during shifts with "shift up" setting likely being somewhat different from the "shift down" setting, user is commanded to teach geared powertrain positions in both "shift in" as well as "shift out" modes with each being pertinent to direction of actuation of gearing system. Therefore upon completing the aforementioned "Teaching" sequence, the rider is instructed through prompt window 292 to "Re-Teach" all settings in opposite "shift" direction.

With reference to FIG. 19, touchscreen display 58 of the alternate embodiments of the automatic bicycle shifter and learn user interface of the present invention in "Programming Mode" operator screen 286 entered into by depressing button 285 comprises aforementioned bicycle miles or kilometers (KM) units selection switch 290, bicycle speed display window 291, bicycle power transmission device shift position window 293, user prompt window 292 serving in "Programming Mode" to walk the user through programming of the power transmission device for up to 9 distinct shift speed programs as depicted in window 303 starting with default program 1, with programmed positions 304 denoted by text "Set" depicted with a green background highlight, active programming position 305 denoted by text "Do" depicted with a gray background highlight, and with undefined program positions 306 denoted by text "Not Set" depicted with an amber background highlight. Upon entry into "Programming Mode", window 292 prompts the user to define the number of desired "Shift Speeds" to program entered by depressing desired number from shift positions displayed in windows 307 and 308 depicting all available power transmission device shift positions 309 previously defined in "Teach Mode" screen 284 depicted with a white background and with unavailable power transmission device shift positions 310 denoted by text "No" depicted in dark gray background highlight. User input into windows 307 and 308 indicating desired shift positions to program being any number from 2 up to any of shift positions 309 defined in "Teach Mode" screen 284 as depicted in white background, subsequently causes desired shift positions set 311 up to and including depressed power transmission device shift position to be denoted by text "Not Set" and are depicted with amber background highlight confirming user of availability for programming except for position 1 which is denoted by text "Set" indicating position is default from standstill and with position 2 denoted by text "Do" indicating being active for programming. Window 292 prompts the user to program shift position 312 denoted by text "Do" and depicted with a gray background highlight by accelerating the bicycle to desired shifting speed threshold and depressing set button 313 once the shifting speed threshold for that position is reached to set. Upon definition, a programed shift position 314 is denoted by text "Set" and is depicted with a green background highlight, with window 292 prompting the user to program the following shift position 312 which is then denoted by text "Do" and is depicted with gray background highlight. User again, accelerates to desired shifting speed threshold for that shift position and depresses set button 313 once that shifting speed threshold is reached to set. Windows 292, 307, 308, 312 and 314 then update for programming of following shift position with process continuing until all desired shift positions are programmed. User is additionally granted the ability to define "skip speeds" for the power transmission device for program being defined in window 303 by depressing any of the "Not Set" shift positions 311 following active shift position denoted by text "Do" depicted with a gray background highlight with action causing skipped over position or positions 315 to be denoted by text "Skip" and are depicted in a yellow highlight background, and with the depressed position then denoted by text "Do" for programming and is depicted with a gray background highlight, thereby enabling capability of operating the bicycle with less shifts throughout range of bicycle operation than available by the power transmission device. User is also granted the capability to enter into automatic mode by depressing auto or manual selection switch 316, which default to manual upon entry into "Programming Mode" 286, at any time to test programmed speeds in an automatic operation mode of the bicycle with window 293 always displaying the active shift position, and with windows 307 and 308 denoting the next shift position by text "Do" and a gray background highlight for reprogramming as desired available in either manual or automatic mode, save program button 319 can be depressed at any time to save programmed speed positions for active program position 305 denoted by text "Do" and depicted with a gray background notwithstanding whether all desired shift speeds are defined or not. User can switch to another program number at will to start a new program by depressing any of program positions 306 in window 303 denoted by text "Not Set" and depicted with an amber background highlight for programming of that program number also notwithstanding whether all positions in the prior program were all defined or not. Also, available in either manual or automatic mode, "Recall program" button 320 followed by rider depressing any of saved program positions 304 serves to recall any saved program which is then denoted by text "Do" and depicted with a gray background at any time for reprogramming or testing at will. For maximum flexibility, no restriction is placed on programming of shift positions, skipped shift positions, repetition of shift positions or the number of shift programs prior to the user being able to enter into "Operation Mode" operator screen 288.

As it is often desired to often vary the shifting speed threshold depending on whether the bicycle is accelerating or decelerating, upon rider depressing set button 313, the shifting speed is compared to last shifting speed and if higher, the shifting speed threshold is applied for both acceleration as well as deceleration. If the shifting speed is lower than last shifting speed, the default deceleration shifting speed thresholds defined in acceleration mode is overwritten for deceleration accordingly.

With reference to FIG. 20, touchscreen display 58 of the alternate embodiments of the automatic bicycle shifter and learn user interface of the present invention in "Operation Mode" operator screen 288 entered into by depressing button 287 comprises bicycle miles or kilometers (KM) units selection button 290, bicycle speed display 291, accumulated trip mileage 321, odometer 322, time 323, date 324, temperature display 325 which defaults to degrees "Fahrenheit" units if miles units are selected through button 290 or degrees "Celsius" units if KM units are selected, stop watch 330 with start and stop capability, recall program button 331 used to activate programs saved through window 303 in "Programming Mode" screen 286 and depicted in window 332 with a white background and denoted with an "Off" designation and which upon activation take on a gray background with an "On" designation with selection buttons not programmed in "Programming Mode" screen 286 displayed in a disabled black background with a "No" designation, save program button 333 used to save any modification to recalled program selection assigned a gray background and denoted by an "On" designation in window 332 through "Auto Learn" mode of "Operation Mode" screen 288, shift setting window 334 depicting current shift position from those defined in windows 307 and 308 in "Programming Mode" screen 286, shift mode selection button 335 used to place shifting of the bicycle in automatic or manual mode, shift up override button 336 and shift down override button 337 used to immediately force shifting up or down of speeds defined in windows 307 and 308 in "Programming Mode" screen 286. "Operation Mode" screen 288 additionally comprises "Automatic Shift Bias" touch control slide bar 338 serving to permit rider to scale up or down programmed speed shifting speed thresholds of programmed shift positions of windows 307 and 308 of "Programming Mode" 286 by an arbitrary selected percentage on the order of plus/minus 30% for active program selection in window 332 denoted with "On" designation based on own preference in real time, and "Inclination Look Ahead" road inclination touch control slide bar 339 serving to force GPS Altimeter to read road altitude at expected rider location based on rider real time direction and speed in seconds increments of 1 second to an arbitrarily selected 10 seconds to be employed by inclination compensation software algorithm employed by control system 59 for active program selection in window 332 denoted with "On" designation in order to adjust pedaling effort levels based on road inclination in real time.

"Operation Mode" screen additionally includes controls permitting the rider to activate an "Auto Learn" mode through mode selection button 340 which forces control system 59 to track rider shifting commands issued through shift up button 336 and shift down button 337 and alter shifting speed settings defined in programming windows 307 and 308 of "Programming Mode" screen 286 accordingly through in either an "overwrite" mode or a "weighed average" mode per "Learn Mode" selection button 276 defined in "Learn Mode" screen 208. The procedure for "Auto Learn" encompasses two conditions the first of which arises when the rider desires to force control system 59 to modify a shift speed setting prior to reaching respective automatic shifting speed with the rider thereof pressing the shift up button 336 to shift up and shift down button 337 to shift down to modify that shift setting, and with the second condition arising when the rider desires to modify last automatic shift conducted by control system 59 with the rider within an arbitrary selected time of 2 seconds of the automatic shift depressing the shift up button 336 or the shift down button 337 to force control system 59 to undo the last shift and to adjust that automatic shift speed setting per rider subsequent command conducted by depressing either the shift up button 336 or shift down button 337 when the modified desired speed is reached. Rider can additionally enable or disable road inclination compensation altogether through "Inclination Comp" touchscreen bar 341 enabling control of the level of inclination compensation being applied by control system 59 with 100% being fully applied and 0% being completely "off".

Auto Learn Mode & Weighed Average Computation—FIG. 21

With Reference to FIG. 21, the preferred and alternate embodiments of the automatic bicycle shifter and learn user interface of the present invention make use of a "Auto Learn Mode" which, when enabled, through depressing either switch 252 of "Operation Mode" operator screen 206 of the preferred embodiment of the present invention or switch 340 of "Operation Mode" operator screen 288 of the alternate embodiments of the present invention, tracks shift commands of the rider and depending on setting of selection switch 276 in aforementioned "Learn Mode" operator screen 208, either overwrite the speed shifting thresholds data or performs a weighed average calculation to continuously update the shift criteria programmed by the rider in windows 225, 307 and 308 of "Programming Mode" user interfaces 204 and 286 for active program selection in windows 232 and 332 of the preferred and alternate embodiments of the present invention respectively. The weighed calculation measurement tracks in a 32 bit integer register, example count integer register 342, of the controller the count or number of shift adjustments made to a certain shift setting, example shift setting 343, of a shift program, example shift program 344, with every shift setting adjustment subsequently stored in a 32 bit float register, example reading float register 345, performing with nth count increment weighed average calculation 346 defined as follows, $$(\text{Weighed Average})_n = (((\text{Average})_{n-1} \times (\text{Count})_{n-1}) + (\text{Reading})_n) / (\text{Count})_n$$

With the 32 bit result overwriting the $(\text{Average})_n$ 32 bit float Register, example average float register 347, and is used for the following iteration becoming the $(\text{Average})_{n-1}$ value on the next calculation made upon a following shift command being issued for that particular shift setting. Memory space map in FIG. 20 depicts how the bike shifter control system stores the weighed average data for each shift position for each rider program with an example of programs 1 through 9 laid out on the horizontal axis and memory map for all shift settings on the vertical axis with memory maps for programs 2 through 8 being duplications of that depicted in FIG. 20 for Programs 1 and 9.

Figure 22D:
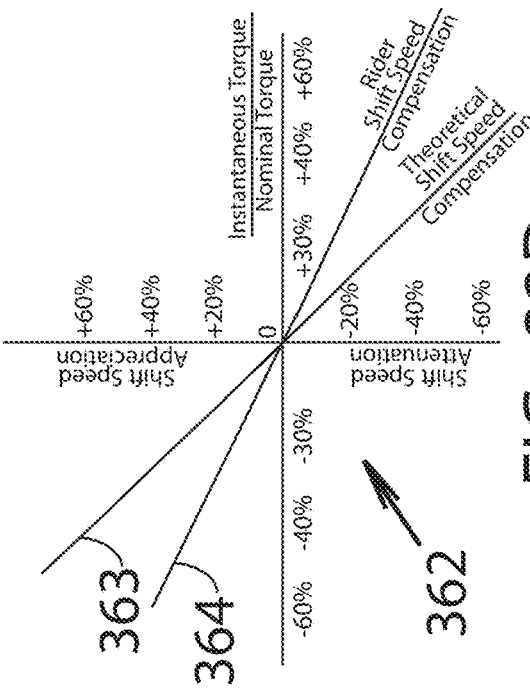
FIG. 22D is a graph of the proposed inclination, wind speed and acceleration shift speed compensation algorithm of the preferred and alternate embodiments of the automatic bicycle shifter and learn user interface of the present invention.
Figure 22A:
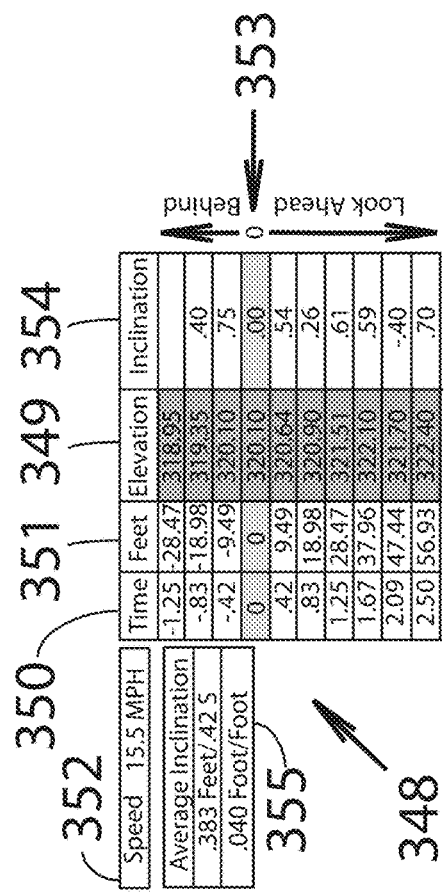
FIG. 22A is a view of the memory map of the proposed inclination computation algorithm of the preferred and alternate embodiments of the automatic bicycle shifter and learn user interface of the present invention.
Figure 22C:
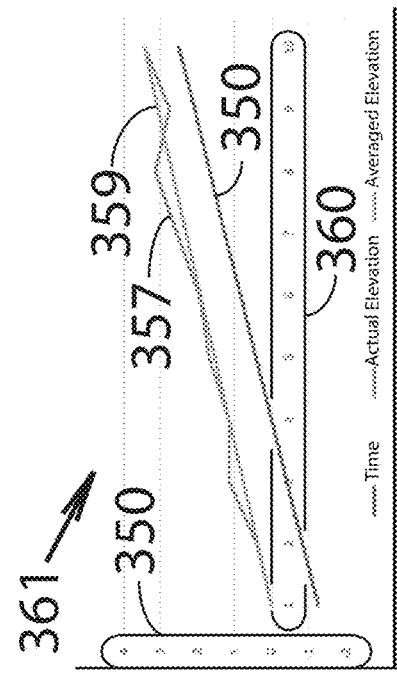
FIG. 22C is a graph for comparison of the proposed inclination computation algorithm results to the actual inclination data of the preferred and alternate embodiments of the automatic bicycle shifter and learn user interface of the present invention.
Figure 22B:
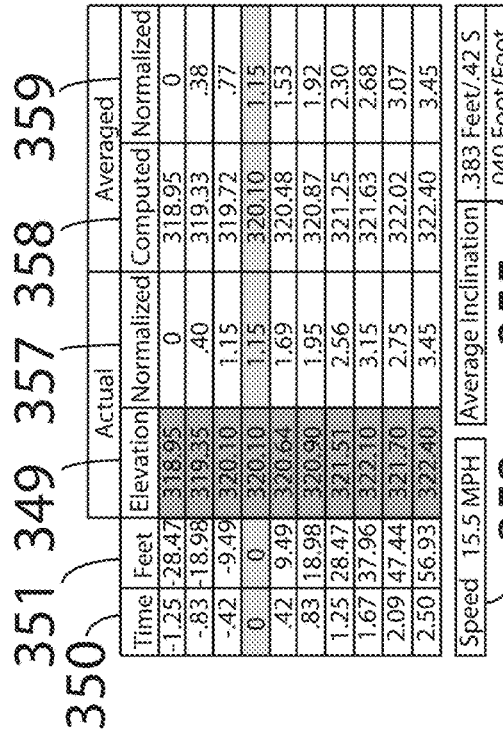
FIG. 22B is a view of the memory map of the proposed inclination computation algorithm of the preferred and alternate embodiments of the automatic bicycle shifter and learn user interface of the present invention, expanded for illustration purposes.

GPS Altimeter Based Inclination Compensation—FIGS. 22A-22C

With Reference to FIG. 22A, the preferred and alternate embodiments of the automatic bicycle shifter and learn user interface of the present invention make use of a novel approach for shift speed attenuation and appreciation based on differentiation of data of Global Positioning System (GPS) Altimeter for rider position in real time and "Look Ahead" data based on rider travel direction and speed in a distinct set of approach points in arbitrary intervals definable by the rider, with example depicted in FIGS. 22A, 22B & 22C making use of 2.50 seconds, in order to determine whether the rider is headed up or down an incline with a definite slope or is simply on a bumpy road resulting in noisy elevation data. With reference to FIG. 22A again, control system 14 for the preferred embodiment and control system 59 for the alternate embodiments of the automatic bicycle shifter and learn user interface of the present invention tracks Altimeter data received from GPS 17 and 63 of the preferred and alternate embodiments of the present invention respectively and records reading thereof in revolving memory map 348 based on the arbitrary time interval entered by the rider, which in the illustrated example spans from −1.25 seconds to +2.5 seconds arbitrarily divided into 10 divisions of 0.42 seconds each with 0 seconds being the actual position of the rider in real time, negative time values being location data behind the rider and positive time values representing encroaching rider location points. With memory map 348 updating in real time, all values depicted thereof index or shift up every 0.42 seconds with rider location so that the data in the memory map is constantly relevant. Therefore, at any given time, a single GPS Altimeter data point is being recorded, in this case at 2.5 seconds, with lapsed GPS Altimeter data values indexing or shifting up through the memory map once every 0.42 seconds. With GPS Altimeter data recorded in "Elevation" register bank 349 corresponding to time increments in time register bank 350, distances for approach points are computed and recorder in register bank 351 based on rider speed in register 352 at the time corresponding "Elevation" measurement was taken, with rider position in real time in row 353 denoted by time equal to zero. The software computes the average road inclination through average of the sum of all values in Altimeter register bank 354, derived by subtraction of each Altimeter reading in register bank 349 from the preceding reading thereof, and division by the total number of readings with the result then stored in registers 355 and subsequently passed to the inclination compensation routine for shifting speed attenuation if the inclination average in register 355 is positive and appreciation of the shifting speeds if the inclination average in register 355 is negative thereby indicating declination. With rider speed necessarily being a continuous function with thereof value in register 352 constantly updating, only the distance value in register bank 351 corresponding to 2.5 seconds updates accordingly in real time with thereof value along with corresponding Altimeter value in register bank 349 indexing or shifting up through the memory map as time lapses with all other data suffering no impact due to the speed change, i.e. as long as the distance data in register bank 351 is representative of Altimeter data in register bank 349, the data, notwithstanding any changes in rider speed, remains accurate and no real time updates are necessary. The inconsistency due to this approach is that the bulk of the data in memory map 348 does not necessarily accurately depict rider position for any given time as the rider speed changes but this is of no consequence to the accuracy of the calculations as the relation between distance and elevation remains accurate and the inclination results thereof accordingly. Alternately, for better accuracy the data point measured by the GPS Altimeter could be assigned a weighed average based on the rider speed in real time.

With reference to FIG. 22B, memory map 348 of FIG. 22A is duplicated into matrix 356 for illustration purposes of the inclination computation methodology with matrix 356 additionally including normalization of actual elevation data in register bank 349 into column 357 for plotting and comparison purposes. The computed linear inclination data in column 358 is derived by application of the inclination average in register 355 to the first or "Rearmost" elevation value in register bank 349 and entry into the following time increment register in column 358 with subsequent addition of the inclination average in register 355 to the computed value and entry into the following register, so on and so forth with every sequential register, resulting in a linear progression due to application of a constant inclination value to the corresponding constant time increments in memory bank 350. Subsequent normalization of the linearized data in column 358 into column 359 confirms a linear increment with each register in an amount equal to average inclination value in register 355.

With reference to FIG. 22C, plot 361 of the normalized actual elevation data in column 357 vs. the normalized averaged elevation data in column 359 serves to depict how the averaged linear inclination data overlays the actual inclination data using the register count 360 as the abscissa and time 350 as the ordinate.

Inclination, Wind Load and Acceleration Compensation—FIG. 22D

With Reference to FIG. 22D, the preferred and alternate embodiments of the automatic bicycle shifter and learn user interface of the present invention, aside from inclination compensation, incorporate by default compensation for rider acceleration, deceleration and wind resistance with each of these parameters very closely resembling inclination from a dynamics analysis standpoint. This is illustrated by the application of the derivative of the classical mechanics law of conservation of energy, or conservation of power exerted by the rider at any given point in time necessitating that the pedals torque exerted by the rider multiplied by the rotational speed of the pedals is equal to sum of climb effort, acceleration, frictional losses and air resistance.

Nominal values for acceleration at shift speeds are recorded in a memory map in random access memory 32 and 81 for the preferred and alternate embodiments of the automatic bicycle shifter and learn user interface of the present invention respectively with the rider preferably on a level surface during normal acceleration, and under normal wind conditions as confirmed by comparison of hot wire Anemometer readings to measured speed of the bicycle, and corresponding values of exerted torque by the rider are computed and also recorded. Applicant proposes that the rider is likely to shift a certain speed when the corresponding recorded nominal torque value for that shift speed is reached either during acceleration or on an inclined surface and/or both and/or at higher wind resistance.

Therefor acceleration, inclination and wind resistance compensation of the preferred and alternate embodiments of the automatic bicycle shifter and learn user interface of the present invention is based on evaluation of the conservation of energy mathematical expression and adjustment of each nominal shift speed, a function of the rotational speed of the pedals, to satisfy the nominal shift torque recorded for each speed, decreasing or being attenuated during acceleration, on rising surfaces and under frontal wind loads, and increasing or being appreciated during deceleration, on declining surfaces, and under rearward wind loads accordingly. With the term being evaluated by the software on a constant basis in real time, relative speed adjustments are thereby computed and applied to all shift speeds also in real time.

Applicant additionally stresses that although recording of nominal shifting settings is best achieved on a level surface and under nominal wind and acceleration conditions for accurate recording of rider shifting torque values, this is not necessary from a mathematical analysis standpoint as the governing relation applies under any condition thereof. Therefore the nominal shifting speed settings of the bicycle although preferably accomplished under standard conditions, could alternately be achieved under any non standard condition at arbitrary road inclinations, arbitrary accelerations and under various wind load conditions.

With reference to FIG. 22D again, graph 362 serves to illustrate the governing expected linear relationship between shift speed compensation and ratio of expected or computed torque at nominal shift speed under instantaneous conditions to nominal rider shift torque. As the governing equation of the shift speed compensation is a simple product of the torque and the rotation velocity of the pedals "TO", expected plot of the speed attenuation, exerted torque vs. rotation speed of the pedals results in a straight line 363 with slope equal to "1". This relation, however, being potentially subject to rider preference as well, as rider data is accrued, the slope of governing relationship line is further refined by the software through computation and recording of data points of rider exerted torque under varying conditions as depicted by line 364 with the software upon enough data points being accrued and confirmed, resulting to application of shift speed compensation based on rider shift speed compensation line in order to better suit rider preference.

The invention claimed is:

1. An automatic bicycle shifter electronic control system comprising,
   a) a processor, a random access memory, a computer code for evaluation of a conservation of energy mathematical expression relating rotational speed of a bicycle pedals and thereto applied torque by a rider to weight and frontal area of said rider, forward speed of and acceleration of said bicycle, road inclination and wind speed,
   b) a speed sensor for measuring said forward speed, an accelerometer for measuring said forward acceleration, a hot wire anemometer for measuring said wind speed and a GPS altimeter for measuring said road inclination,
   c) an electrically powered touchscreen display including a programming mode screen, a learn mode screen, an operation mode screen,
   d) said learn mode screen including buttons and a keypad for entry of geometric dimensions and weight of said rider, powertrain ratios and tire diameter of said bicycle in said random access memory,
   e) said programming mode screen including a button for recording of a nominal shifting speeds for said bicycle on a flat surface in said random access memory, and
   f) said operation mode screen including a programmed shift speed shift up override button and a shift down override button,
   whereby said processor constructs a nominal theoretical graph of shift speeds compensation in relation to computed instantaneous torque to computed shifting torque at said nominal shifting speeds and modifies said nominal theoretical graph of shift speed compensation based on actuation of said shift speed shift up override and shift down override buttons by said rider for more accurate automatic shifting.

2. The automatic bicycle shifter electronic control system of claim 1 wherein said learn mode screen further includes a calibrate speed button for accurate calibration of said speed sensor of said bicycle.

3. The automatic bicycle shifter electronic control system of claim 1 wherein said operation mode screen further includes a GPS inclination look ahead setting bar.

4. The automatic bicycle shifter electronic control system of claim 1 wherein said learn mode screen further includes a window for display of said nominal shifting speed settings for said bicycle.

5. An automatic bicycle shifter electronic control system comprising,
   a) a processor, a random access memory, a computer code for calculation of a conservation of energy mathematical expression relating rotational speed of a bicycle pedals and thereto applied torque by a rider to weight and frontal area of said rider, forward speed of and acceleration of said bicycle, road inclination and wind speed,
   b) a speed sensor for measuring said forward speed, an accelerometer for measuring said forward acceleration, a hot wire anemometer for measuring said wind speed and a GPS altimeter for measuring said road inclination,
   c) an electrically powered touchscreen display including a programming mode screen, a learn mode screen, an operation mode screen,
   d) said learn mode screen including buttons and a keypad for entry of geometric dimensions and weight of said rider, powertrain ratios and tire diameter of said bicycle in said random access memory,
   e) said programming mode screen including a button for recording of a nominal shifting speeds for said bicycle on a flat surface in said random access memory, and
   f) said operation mode screen including a programmed shift speed shift up override button and a shift down override button,
   whereby said processor constructs a graph of theoretical shift speed compensation for all speeds based on input of said rider in said programming mode through evaluation of said conservation of energy mathematical expression and upon subsequent actuation of said shift up override button and shift down override button, modifies said rider shifting graph of theoretical rider shift compensation for more accurate automatic shifting.

6. The automatic bicycle shifter electronic control system of claim 5 wherein said operation mode screen further includes an automatic shift bias touchscreen bar serving to scale up or scale down a programmed shifting speed settings.

7. The automatic bicycle shifter electronic control system of claim 5 wherein said learn mode screen further includes a window for display of said nominal shifting speed settings for said bicycle.

* * * * *